(12) United States Patent
Wise et al.

(10) Patent No.: US 7,890,407 B2
(45) Date of Patent: *Feb. 15, 2011

(54) SYSTEM AND METHOD FOR ESTIMATING CONDUIT LIQUIDITY REQUIREMENTS IN ASSET BACKED COMMERCIAL PAPER

(75) Inventors: Eric S. Wise, New York, NY (US); Roger J. Pellegrini, Scarsdale, NY (US); John R. Rhinelander, Chattham, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 353 days.

This patent is subject to a terminal disclaimer.

(21) Appl. No.: 11/928,126

(22) Filed: Oct. 30, 2007
(Under 37 CFR 1.47)

(65) Prior Publication Data
US 2008/0086404 A1    Apr. 10, 2008

Related U.S. Application Data

(63) Continuation of application No. 09/817,439, filed on Mar. 26, 2001, now Pat. No. 7,313,541.

(60) Provisional application No. 60/245,476, filed on Nov. 3, 2000.

(51) Int. Cl.
*G06Q 40/00* (2006.01)
(52) U.S. Cl. .................................. 705/36 R; 705/35
(58) Field of Classification Search .................... 705/35, 705/36 R
See application file for complete search history.

(56) References Cited

U.S. PATENT DOCUMENTS

| | | |
|---|---|---|
| 4,169,285 A | 9/1979 | Walker |
| 4,648,038 A | 3/1987 | Roberts et al. |
| 4,739,478 A | 4/1988 | Roberts et al. |
| 4,742,457 A | 5/1988 | Leon et al. |
| 4,752,877 A | 6/1988 | Roberts et al. |

(Continued)

FOREIGN PATENT DOCUMENTS

WO    WO 98/43170    10/1998

(Continued)

OTHER PUBLICATIONS

Gary W. Emery et al. "The Measurement of Liquidity" Journal of Accounting Research, vol. 20, No. 2, Part I (Autumn, 1982), 290-303.*

(Continued)

*Primary Examiner*—Narayanswamy Subramanian
*Assistant Examiner*—Asha Puttaiah
(74) *Attorney, Agent, or Firm*—Hunton & Williams, LLP

(57) ABSTRACT

A method and system for financial modeling to predict the amount of liquidity needed to support a portfolio of assets that is being financed in the commercial paper market, or any other market that is sensitive to the provision of liquidity. As the ability to access these markets is related to the rating of the assets, the model simulates rating movements over time and uses historical funding information of like assets to make estimates of future funding needs. Many aspects of the funding (draw) process are simulated (i.e., likelihood of draw, likelihood of continuing draw, and extent of draw amount). The result of the model is an estimate of reduced liquidity needs that is less than if the underlying assets were guaranteed individually, providing economic savings for the liquidity provider. A model is also described that predicts the required characteristics of a group of institutions jointly functioning as liquidity provider to the pool.

13 Claims, 19 Drawing Sheets

U.S. PATENT DOCUMENTS

| | | | |
|---|---|---|---|
| 4,933,842 A | 6/1990 | Durbinet et al. | |
| 5,121,469 A | 6/1992 | Richards et al. | |
| 5,222,019 A | 6/1993 | Yoshino et al. | |
| 5,257,369 A | 10/1993 | Skeen et al. | |
| 5,270,922 A | 12/1993 | Higgins | |
| 5,297,032 A | 3/1994 | Trojan et al. | |
| 5,305,200 A | 4/1994 | Hartheimer et al. | |
| 5,419,890 A | 5/1995 | Saidi | |
| 5,454,104 A | 9/1995 | Steidlmayer et al. | |
| 5,462,438 A | 10/1995 | Becker et al. | |
| 5,497,317 A | 3/1996 | Hawkins et al. | |
| 5,517,406 A | 5/1996 | Harris et al. | |
| 5,557,798 A | 9/1996 | Skeen et al. | |
| 5,563,783 A | 10/1996 | Stolfo et al. | |
| 5,592,379 A | 1/1997 | Finfrock et al. | |
| 5,649,186 A | 7/1997 | Ferguson | |
| 5,675,746 A | 10/1997 | Marshall | |
| 5,692,233 A | 11/1997 | Garman | |
| 5,706,502 A | 1/1998 | Foley et al. | |
| 5,710,889 A | 1/1998 | Clark et al. | |
| 5,724,593 A | 3/1998 | Hargrave, III et al. | |
| 5,778,157 A | 7/1998 | Oatman et al. | |
| 5,783,808 A | 7/1998 | Josephson | |
| 5,787,402 A | 7/1998 | Potter et al. | |
| 5,802,499 A | 9/1998 | Sampson et al. | |
| 5,806,047 A | 9/1998 | Hackel et al. | |
| 5,806,048 A | 9/1998 | Kiron et al. | |
| 5,812,988 A | 9/1998 | Sandretto | |
| 5,819,237 A | 10/1998 | Garman | |
| 5,819,238 A | 10/1998 | Fernholz | |
| 5,819,273 A | 10/1998 | Vora et al. | |
| 5,832,461 A | 11/1998 | Leon et al. | |
| 5,845,265 A | 12/1998 | Woolston | |
| 5,845,266 A | 12/1998 | Lupien et al. | |
| 5,852,811 A | 12/1998 | Atkins | |
| 5,864,827 A | 1/1999 | Wilson | |
| 5,884,286 A | 3/1999 | Daughtery, III | |
| 5,890,140 A | 3/1999 | Clark et al. | |
| 5,893,078 A | 4/1999 | Paulson | |
| 5,913,202 A | 6/1999 | Motoyama | |
| 5,913,214 A | 6/1999 | Madnick et al. | |
| 5,918,218 A | 6/1999 | Harris et al. | |
| 5,922,044 A | 7/1999 | Banthia | |
| 5,926,792 A | 7/1999 | Koppes et al. | |
| 5,926,800 A | 7/1999 | Baronowski et al. | |
| 5,940,810 A | 8/1999 | Traub et al. | |
| 5,944,784 A | 8/1999 | Simonoff et al. | |
| 5,946,667 A | 8/1999 | Tull, Jr. et al. | |
| 5,950,175 A | 9/1999 | Austin | |
| 5,950,176 A | 9/1999 | Keiser et al. | |
| 5,963,923 A | 10/1999 | Garber | |
| 5,966,531 A | 10/1999 | Skeen et al. | |
| 5,966,672 A | 10/1999 | Knupp | |
| 5,966,700 A | 10/1999 | Gould et al. | |
| 5,970,479 A | 10/1999 | Shepherd | |
| 5,978,780 A | 11/1999 | Watson | |
| 5,986,673 A | 11/1999 | Martz | |
| 5,987,435 A | 11/1999 | Weiss et al. | |
| 5,995,943 A | 11/1999 | Bull et al. | |
| 6,006,206 A | 12/1999 | Smith et al. | |
| 6,012,042 A | 1/2000 | Black et al. | |
| 6,012,046 A | 1/2000 | Lupien et al. | |
| 6,016,483 A | 1/2000 | Rickard et al. | |
| 6,018,714 A | 1/2000 | Risen, Jr. | |
| 6,018,721 A | 1/2000 | Aziz et al. | |
| 6,018,722 A | 1/2000 | Ray et al. | |
| 6,021,397 A | 2/2000 | Jones et al. | |
| 6,021,398 A | 2/2000 | Ausubel | |
| 6,023,280 A | 2/2000 | Becker et al. | |
| 6,026,383 A | 2/2000 | Ausubel | |
| 6,029,146 A | 2/2000 | Hawkins et al. | |
| 6,029,147 A | 2/2000 | Horadan et al. | |
| 6,035,287 A | 3/2000 | Stallaert et al. | |
| 6,049,783 A | 4/2000 | Segal et al. | |
| 6,052,673 A | 4/2000 | Leon et al. | |
| 6,055,522 A | 4/2000 | Krishna et al. | |
| 6,058,378 A | 5/2000 | Clark et al. | |
| 6,058,379 A | 5/2000 | Odom et al. | |
| 6,061,662 A * | 5/2000 | Makivic | 705/36 R |
| 6,064,984 A | 5/2000 | Ferguson et al. | |
| 6,073,104 A * | 6/2000 | Field | 705/2 |
| 6,073,109 A | 6/2000 | Flores et al. | |
| 6,073,115 A | 6/2000 | Marshall | |
| 6,076,072 A | 6/2000 | Libman | |
| 6,078,903 A | 6/2000 | Kealhofer | |
| 6,078,904 A | 6/2000 | Rebane | |
| 6,078,914 A | 6/2000 | Redfern | |
| 6,078,956 A | 6/2000 | Bryant et al. | |
| 6,081,774 A | 6/2000 | de Hita et al. | |
| 6,085,176 A | 7/2000 | Woolston | |
| 6,088,685 A | 7/2000 | Kiron et al. | |
| 6,088,686 A | 7/2000 | Walker et al. | |
| 6,092,056 A | 7/2000 | Tull, Jr. et al. | |
| 6,105,005 A | 8/2000 | Fuhrer | |
| 6,131,082 A | 10/2000 | Hargrave, III et al. | |
| 6,134,600 A | 10/2000 | Liu | |
| 6,148,298 A | 11/2000 | LaStrange et al. | |
| 6,173,270 B1 | 1/2001 | Cristofich et al. | |
| 6,173,276 B1 | 1/2001 | Kant et al. | |
| 6,178,420 B1 | 1/2001 | Sassano | |
| 6,182,059 B1 | 1/2001 | Angotti et al. | |
| 6,185,567 B1 | 2/2001 | Ratnaraj et al. | |
| 6,192,347 B1 * | 2/2001 | Graff | 705/36 R |
| 6,195,647 B1 | 2/2001 | Martyn et al. | |
| 6,226,623 B1 | 5/2001 | Schein et al. | |
| 6,233,566 B1 | 5/2001 | Levine et al. | |
| 6,236,972 B1 | 5/2001 | Shkedy | |
| 6,236,977 B1 | 5/2001 | Verba et al. | |
| 6,243,670 B1 | 6/2001 | Bessho et al. | |
| 6,260,021 B1 | 7/2001 | Wong et al. | |
| 6,263,321 B1 | 7/2001 | Daughtery, III | |
| 6,263,335 B1 | 7/2001 | Paik et al. | |
| 6,266,683 B1 | 7/2001 | Yehuda et al. | |
| 6,272,474 B1 | 8/2001 | Garcia | |
| 6,275,229 B1 | 8/2001 | Weiner et al. | |
| 6,278,982 B1 | 8/2001 | Korhammer et al. | |
| 6,278,996 B1 | 8/2001 | Richardson et al. | |
| 6,282,537 B1 | 8/2001 | Madnick et al. | |
| 6,285,986 B1 | 9/2001 | Andrews | |
| 6,285,989 B1 | 9/2001 | Shoham | |
| 6,304,858 B1 | 10/2001 | Mosler et al. | |
| 6,313,854 B1 | 11/2001 | Gibson | |
| 6,317,726 B1 | 11/2001 | O'Shaughnessy | |
| 6,317,728 B1 | 11/2001 | Kane | |
| 6,321,212 B1 | 11/2001 | Lange | |
| 6,323,881 B1 | 11/2001 | Broulik et al. | |
| 6,332,163 B1 | 12/2001 | Bowman-Amuah | |
| 6,338,055 B1 | 1/2002 | Hagmann et al. | |
| 6,338,068 B1 | 1/2002 | Moore et al. | |
| 6,343,287 B1 | 1/2002 | Kumar et al. | |
| 6,347,307 B1 | 2/2002 | Sandhu et al. | |
| 6,349,291 B1 | 2/2002 | Varma | |
| 6,356,933 B2 | 3/2002 | Mitchell et al. | |
| 6,360,210 B1 | 3/2002 | Wallman | |
| 6,366,908 B1 | 4/2002 | Chong et al. | |
| 6,381,585 B1 | 4/2002 | Maples et al. | |
| 6,381,586 B1 | 4/2002 | Glasserman et al. | |
| 6,385,660 B2 | 5/2002 | Griesemer et al. | |
| 6,389,413 B2 | 5/2002 | Takahashi et al. | |
| 6,389,452 B1 | 5/2002 | Glass | |
| 6,401,080 B1 | 6/2002 | Bigus et al. | |
| 6,408,282 B1 | 6/2002 | Buist | |
| 6,411,947 B1 | 6/2002 | Rice et al. | |
| 6,418,417 B1 | 7/2002 | Corby et al. | |

| | | | | | | |
|---|---|---|---|---|---|---|
| 6,421,653 B1 | 7/2002 | May | | 2002/0042767 A1 | 4/2002 | Kwan |
| 6,424,980 B1 | 7/2002 | Iizuka et al. | | 2002/0046154 A1 | 4/2002 | Pritchard |
| 6,429,868 B1 | 8/2002 | Dehner, Jr. et al. | | 2002/0049665 A1 | 4/2002 | Solomon et al. |
| 6,442,545 B1 | 8/2002 | Feldman et al. | | 2002/0049666 A1 | 4/2002 | Reuter et al. |
| 6,446,047 B1 | 9/2002 | Brier et al. | | 2002/0054115 A1 | 5/2002 | Mack et al. |
| 6,446,110 B1 | 9/2002 | Lection et al. | | 2002/0059141 A1 | 5/2002 | Davies et al. |
| 6,457,066 B1 | 9/2002 | Mein et al. | | 2002/0065752 A1 | 5/2002 | Lewis |
| 6,460,021 B1 | 10/2002 | Kirksey | | 2002/0065755 A1 | 5/2002 | Shlafman et al. |
| 6,480,882 B1 | 11/2002 | McAdam et al. | | 2002/0069157 A1 | 6/2002 | Jordan |
| 6,489,954 B1 | 12/2002 | Powlette | | 2002/0073007 A1 | 6/2002 | Ayache |
| 6,490,584 B2 | 12/2002 | Barrett et al. | | 2002/0078253 A1 | 6/2002 | Szondy et al. |
| 6,493,681 B1 | 12/2002 | Tertitski et al. | | 2002/0087373 A1 | 7/2002 | Dickstein et al. |
| 6,510,406 B1 | 1/2003 | Marchisio | | 2002/0087454 A1 | 7/2002 | Calo et al. |
| 6,516,303 B1 | 2/2003 | Wallman | | 2002/0087455 A1 | 7/2002 | Tsagarakis et al. |
| 6,516,308 B1 | 2/2003 | Cohen | | 2002/0087457 A1 | 7/2002 | Madeley et al. |
| 6,523,022 B1 | 2/2003 | Hobbs | | 2002/0091609 A1 | 7/2002 | Markowski |
| 6,556,987 B1 | 4/2003 | Brown et al. | | 2002/0099646 A1 | 7/2002 | Agarwal et al. |
| 6,564,250 B1 | 5/2003 | Nguyen | | 2002/0099656 A1 | 7/2002 | Poh Wong |
| 6,581,056 B1 | 6/2003 | Rao | | 2002/0112056 A1 | 8/2002 | Baldwin et al. |
| 6,581,062 B1 | 6/2003 | Draper et al. | | 2002/0116331 A1 | 8/2002 | Cataline et al. |
| 6,598,028 B1 | 7/2003 | Sullivan et al. | | 2002/0123947 A1 | 9/2002 | Yuste et al. |
| 6,601,044 B1 | 7/2003 | Wallman | | 2002/0130868 A1 | 9/2002 | Smith |
| 6,611,825 B1 | 8/2003 | Billheimer et al. | | 2002/0138390 A1 | 9/2002 | May |
| 6,615,187 B1 | 9/2003 | Ashenmil et al. | | 2002/0138414 A1 | 9/2002 | Baker, IV |
| 6,629,097 B1 | 9/2003 | Keith | | 2002/0147671 A1 | 10/2002 | Sloan et al. |
| 6,631,373 B1 | 10/2003 | Otani et al. | | 2002/0152154 A1 | 10/2002 | Rothman et al. |
| 6,633,868 B1 | 10/2003 | Min et al. | | 2002/0152156 A1 | 10/2002 | Tyson-Quah |
| 6,711,554 B1 | 3/2004 | Salzmann et al. | | 2002/0153415 A1 | 10/2002 | Minami et al. |
| 6,832,209 B1 | 12/2004 | Karp et al. | | 2002/0156658 A1 | 10/2002 | Selesny et al. |
| 6,999,938 B1 | 2/2006 | Libman | | 2002/0161692 A1 | 10/2002 | Loh et al. |
| 7,085,759 B2 | 8/2006 | Kingham et al. | | 2002/0161853 A1 | 10/2002 | Burak et al. |
| 7,110,998 B1 | 9/2006 | Bhandari et al. | | 2002/0169707 A1 | 11/2002 | Koek et al. |
| 7,191,392 B1 | 3/2007 | Coar | | 2002/0174043 A1 | 11/2002 | Gilbert et al. |
| 7,212,993 B1 | 5/2007 | Bodurtha et al. | | 2002/0178096 A1 | 11/2002 | Marshall |
| 7,222,094 B2 | 5/2007 | Ross | | 2002/0184132 A1 | 12/2002 | Foster |
| 7,249,037 B2 | 7/2007 | Koppes et al. | | 2002/0184237 A1 | 12/2002 | McFeely |
| 7,249,075 B1 | 7/2007 | Altomare et al. | | 2002/0194097 A1 | 12/2002 | Reitz |
| 7,313,541 B2 | 12/2007 | Wise et al. | | 2002/0194114 A1 | 12/2002 | Erdmier |
| 7,376,606 B2 | 5/2008 | Jacobsen | | 2002/0198818 A1 | 12/2002 | Scott et al. |
| 7,392,210 B1 | 6/2008 | MacKay et al. | | 2003/0004942 A1 | 1/2003 | Bird |
| 7,392,212 B2 | 6/2008 | Hancock et al. | | 2003/0009411 A1 | 1/2003 | Ram et al. |
| 7,577,604 B2 | 8/2009 | Ogilvie | | 2003/0014343 A1 | 1/2003 | Jones |
| 7,596,526 B2 | 9/2009 | Blauvelt et al. | | 2003/0018558 A1 | 1/2003 | Heffner et al. |
| 7,620,578 B1 | 11/2009 | Belton et al. | | 2003/0018714 A1 | 1/2003 | Mikhailov et al. |
| 2001/0011241 A1 | 8/2001 | Nemzow | | 2003/0028456 A1 | 2/2003 | Yolles |
| 2001/0011242 A1 | 8/2001 | Allex et al. | | 2003/0033212 A1 | 2/2003 | Sandhu et al. |
| 2001/0018674 A1 | 8/2001 | Schein et al. | | 2003/0037174 A1 | 2/2003 | Lavin et al. |
| 2001/0020236 A1 | 9/2001 | Cannon | | 2003/0065594 A1 | 4/2003 | Murphy |
| 2001/0025264 A1 | 9/2001 | Deaddio et al. | | 2003/0066025 A1 | 4/2003 | Garner et al. |
| 2001/0032217 A1 | 10/2001 | Huang | | 2003/0066032 A1 | 4/2003 | Ramachandran et al. |
| 2001/0041344 A1 | 11/2001 | Sepetov et al. | | 2003/0078869 A1 | 4/2003 | Williams |
| 2001/0042034 A1 | 11/2001 | Elliott | | 2003/0088496 A1 | 5/2003 | Piotrowski |
| 2001/0043235 A1 | 11/2001 | Best et al. | | 2003/0093360 A1 | 5/2003 | May |
| 2001/0044771 A1 | 11/2001 | Usher et al. | | 2003/0093362 A1 | 5/2003 | Tupper et al. |
| 2001/0056398 A1 | 12/2001 | Scheirer | | 2003/0093565 A1 | 5/2003 | Berger et al. |
| 2002/0002530 A1 | 1/2002 | May | | 2003/0105806 A1 | 6/2003 | Gayle et al. |
| 2002/0004777 A1 | 1/2002 | Foster et al. | | 2003/0105981 A1 | 6/2003 | Miller et al. |
| 2002/0007335 A1 | 1/2002 | Millard et al. | | 2003/0115122 A1 | 6/2003 | Slater et al. |
| 2002/0007358 A1 | 1/2002 | Johnson et al. | | 2003/0126063 A1 | 7/2003 | Reuter |
| 2002/0010670 A1 | 1/2002 | Mosler et al. | | 2003/0126068 A1 | 7/2003 | Hauk et al. |
| 2002/0013753 A1 | 1/2002 | Marks de Chabris et al. | | 2003/0126069 A1 | 7/2003 | Cha |
| 2002/0013862 A1 | 1/2002 | Orchard et al. | | 2003/0126117 A1 | 7/2003 | Megiddo et al. |
| 2002/0016762 A1 | 2/2002 | Feilbogen et al. | | 2003/0140035 A1 | 7/2003 | Burrows |
| 2002/0016819 A1 | 2/2002 | Sugimoto et al. | | 2003/0149653 A1 | 8/2003 | Penney |
| 2002/0018077 A1 | 2/2002 | Powlette | | 2003/0154071 A1 | 8/2003 | Shreve |
| 2002/0022956 A1 | 2/2002 | Ukraincsky et al. | | 2003/0154306 A1 | 8/2003 | Perry |
| 2002/0023053 A1 | 2/2002 | Szoc et al. | | 2003/0158949 A1 | 8/2003 | Miller et al. |
| 2002/0026405 A1 | 2/2002 | Haar | | 2003/0163401 A1 | 8/2003 | Dines et al. |
| 2002/0026449 A1 | 2/2002 | Azencott | | 2003/0188255 A1 | 10/2003 | Shimizu et al. |
| 2002/0026462 A1 | 2/2002 | Shotton, Jr. et al. | | 2003/0220861 A1 | 11/2003 | Broms et al. |
| 2002/0029183 A1 | 3/2002 | Vlahoplus et al. | | 2003/0220868 A1 | 11/2003 | May |
| 2002/0032644 A1 | 3/2002 | Corby et al. | | 2003/0229718 A1 | 12/2003 | Tock et al. |
| 2002/0035561 A1 | 3/2002 | Archer et al. | | 2003/0233459 A1 | 12/2003 | Miller et al. |

| | | | |
|---|---|---|---|
| 2003/0236862 | A1 | 12/2003 | Miller et al. |
| 2003/0236957 | A1 | 12/2003 | Miller et al. |
| 2004/0039666 | A1 | 2/2004 | Fudali et al. |
| 2004/0064397 | A1 | 4/2004 | Lynn et al. |
| 2004/0078248 | A1 | 4/2004 | Altschuler |
| 2004/0103003 | A1 | 5/2004 | Mayers et al. |
| 2004/0148247 | A1 | 7/2004 | Miller et al. |
| 2004/0162775 | A1 | 8/2004 | Winklevoss et al. |
| 2004/0167850 | A1 | 8/2004 | Dreyer et al. |
| 2004/0215553 | A1 | 10/2004 | Gang et al. |
| 2004/0220885 | A1 | 11/2004 | Salzmann et al. |
| 2004/0225596 | A1 | 11/2004 | Kemper et al. |
| 2004/0236671 | A1 | 11/2004 | Woodruff et al. |
| 2005/0060254 | A1 | 3/2005 | Jones |
| 2005/0060256 | A1 | 3/2005 | Peterson et al. |
| 2005/0075959 | A1 | 4/2005 | Woodruff et al. |
| 2005/0086148 | A1 | 4/2005 | Woodruff et al. |
| 2005/0086170 | A1 | 4/2005 | Rao |
| 2005/0102213 | A1 | 5/2005 | Savasoglu et al. |
| 2005/0102214 | A1 | 5/2005 | Speth et al. |
| 2005/0164762 | A1 | 7/2005 | Smith et al. |
| 2006/0074794 | A1 | 4/2006 | Nespola, Jr. |
| 2006/0136231 | A1 | 6/2006 | Thomas |
| 2007/0005498 | A1 | 1/2007 | Cataline et al. |
| 2007/0043654 | A1 | 2/2007 | Libman |
| 2007/0078771 | A1 | 4/2007 | Allin et al. |
| 2007/0162387 | A1 | 7/2007 | Cataline et al. |

FOREIGN PATENT DOCUMENTS

| | | |
|---|---|---|
| WO | WO 01/20530 | 3/2001 |
| WO | WO 01/37540 | 5/2001 |
| WO | WO 01/57716 | 8/2001 |
| WO | WO 01/59670 | 8/2001 |
| WO | WO 02/03774 | 1/2002 |
| WO | WO 02/14991 | 2/2002 |
| WO | WO 02/054189 | 7/2002 |
| WO | WO 02/056146 | 7/2002 |
| WO | WO 02/063516 | 8/2002 |
| WO | WO 02/065278 | 8/2002 |
| WO | WO 02/065286 | 8/2002 |
| WO | WO 03/012588 | 2/2003 |
| WO | WO 03/030013 | 4/2003 |
| WO | WO 03/032158 | 4/2003 |
| WO | WO 03/065256 | 8/2003 |
| WO | WO 03/102733 | 12/2003 |
| WO | WO 2004-040419 | 5/2004 |

OTHER PUBLICATIONS

Manco et al., A Framework for Adaptive Mail Classification, 14th IEEE Conference on Tools with Artificial intelligence (ICTAI'02), Nov. 4, 2002, p. 387.
Silverman, A new strategy for giving away your money, Wall Street Journal, D1, Oct. 6, 2004.
Czejdo, Automatic generation ontology based anntations in XML and their use in retrieval systems, Web Information Systems Engineering, 2000, Proceedings of the First International Conference, Jun. 19, 2000, p. 296.
Novell, Inc., Beginning of Viewing Information and Viewing Basic Information about a print job.
Block Trades Market Practice, Apr. 1, 2003, pp. 1-10.
Chacko, Cephalon, Inc. Taking Risk Management Gherory Seriously.
Kus, Contingent capital: just in the capital management sets a new standard; Sponsored statement.
Electronic Trading Tools.
Martin, Email Report, Issue 11, Aug. 16, 2001, printed Aug. 2, 2005.
Fast Email Extractor 4.4.
Form 10-K, United States Securities and Exchange Commission, no date, year ending Dec. 31, 2003.
Pila, In Case of Emergency; contingent capital.
Intellseek and Inxight Partner to Provide New Business Intelligence Solutions, www.inxight.com/news/021029_intelliseek.html, Oct. 29, 2002.
Unknown, Investigating Systems.
May, Modeling and Querying Structure and Contents of the Web, 10th International Workshop on Database & Amp; Expert Systems Applications, Sep. 1, 1999, p. 721.
Rupali et al., Phrase-based Text Representation for Managing the Web Documents.
Lam et al., Querying Web Data—The WebQA Approach.
Rising to the challenge of global STP, Euromoney Publications PLC Global Inventor, Nov. 1, 1999, pp. 51-52; ISSN. 0951-3604.
STP in the Bond Market?, Wall Street & Technology, Dec. 1, 2002, p. 20.
Ericson, Softwerc releases patent-pending.
IBM Corp., Strict Read Order Control for a Queing System.
Carchiolo et al., Structuring the Web.
Witten et al., Text Mining: A New Frontier for Lossless Compression.
Fan et al., The Internet and Future Financial Markets; Industry Trend or Event, Association for Computing Machinery, Inc., Sec. 11, vol. 43; Nov. 1, 2000, p. 82; ISSN: 0001-0782.
Emery, et al., The Measurement of Liquidity, Journal of Accounting Research, vol. 20, No. 2, Part 1, p. 290-303, Autumn 1982.
Calado, The Web-DL Environment for Building Digital Libraries from the Web.
Ribiero-Neto et al., Top Down Extraction of Semi-Structured Data, String Processing and Information Retrieval Symposium & amp.
Roberts, Top Priority on Bottom Line: More Companies Seeting to Manage Business Risks.
TradeWeb's STP vision, Euromoney Institutional Investor PLC, Sec. 406, vol. 34, Feb. 1, 2003, p. S6; ISSN: 0014-2433.
Elkayam, Using Indexed Bonds.
Myllymaki, With Standard XML Technologies.
Hewlett-Packard, x4queview.org.
"ABCP Market: Firmly established and still expanding", p. 1-12, New York, May 23, 2000, JPMorgan Securities, Inc.
"Structured Finance; Asset-Backed Presale Report, Eureka Securitisation plc/ Eureka Securization, Inc.", Jun. 16, 2000, p. 1-6, Fitch IBCA.
Moody's Third Quarter 1999 ABCP Market Review, Sep. 16, 1999, p. 1-10, Lake Front Funding Company LLC.
Moody's Second Quarter 1998 ABCP Market Review, Mar. 6, 1998, p. 1-4, Revolving Commitment Vehicle Corporation (RCV).
"Private Placement Memorandum", Apr. 14, 1998, Merrill Lynch Money markets Inc.
"A Pathfinder on Asset-Backed Commercial Paper," p. 1-2, Nov. 1, 2000, www.fordham.edu.
"US Assett-Backed", Nov. 1, 2000, www.fitchibca.com.
Hahn, Thomas K., "Commercial Paper", Nov. 1, 2000, p. 1-14, www.toerien.com.
"Assett-Backed Commercial Paper: Trends & Advances", vol. IV, Aug. 3, 2000, p. 1-4, Fitch IBCA, Duff & Phelps.
"Assett-Backed Commercial Paper Research Tips", Nov. 1, 2000, p. 1-2, www.fordham.edu.
"Assett-Backed Commercial Paper: Trends & Advances", vol. 3, Feb. 24, 2000, p. 1-4, Fitch IBCA, Duff & Phelps.
"Assett backed commercial paper", Nov. 1, 2002, p. 1-3, www.vinodkothari.com.
Anonymous, NASD Investor Alert: "Class B Mutual Fund Shares Do They Make the Grade?", Retrieved from the Internet at: http://web.archive.org/web/20030724111858/www.nasd.com /Investor/Alerts/alert_classb_funds.htm, Jun. 25, 2003.
Huntley, "Class B Mutual Fund Shares Face Increasing Scrutiny Series on Money", St. Petersburg Times, Feb. 6, 2005.
Richburg, Keith et. al., "Despite Madoff Guilty Plea Questions Swirl and Rage Boils Victims Gather at Courthouse as Financier Reports to Jail", The Washington Post, Mar. 13, 2009.
Anonymous, Freddie Mac's Document Custody Procedure Handbook, Chapter 2: Custodian's Duties and Responsibilities, Dec. 2003.

Anonymous, Freddie Mac's Document Custody Procedure Overview, Dec. 2003.

Anonymous, Ginnie Mae 5500.3, Rev. 1, Chapter 1: General Features of the Program (Nov. 2003) and Chapter 10: Assembling and Submitting Pool and Loan Package Issuance Documents (Jul. 2003).

Friis, et al., "Goodbye to Paper?", American Bankers Association, Mar. 1989.

Neumeister, "Madoff Will Plead Guilty", Bennington Banner, Mar. 11, 2009.

Lauricella, et al., "The Madoff Fraud Judge Names Trustee to Liquidate Madoff Firm", The Wall Street Journal Europe, Dec. 17, 2008.

Anonymous, "What We Like About This Site", Abstract Only, Internet banking Growth Strategies, vol. 2, Issue 5, Jan. 2002.

* cited by examiner

ENTITY A

| ASSET 802 | MATURITY 804 | SIMULATION PERIOD 808 | | PREVIOUS DRAW 818 | CONTINUING DRAW 819 | DRAW THIS PERIOD 824 |
|---|---|---|---|---|---|---|
| | | BEGINNING RATING 806 | ENDING RATING 812 | | | |
| 1 | 60 | AA | AA | NO | NO | 0 |
| 2 | 48 | A+ | A+ | NO | NO | 0 |
| 3 | 60 | AA+ | AA+ | NO | NO | 0 |
| 4 | 54 | A- | A- | NO | NO | 0 |
| 5 | 60 | BBB+ | A- | NO | NO | 0 |
| 6 | 48 | AA | AA | NO | NO | 0 |
| 7 | 48 | A- | BBB+ | NO | NO | 0 |
| 8 | 48 | BBB | BBB | YES | NO | 0 |
| 9 | 36 | A | A | NO | NO | 0 |
| 10 | 60 | A+ | A+ | NO | NO | 0 |
| 11 | 54 | AA | AA | NO | NO | 0 |
| 12 | 36 | AAA | AA | NO | NO | 0 |
| 13 | 60 | BB- | BB- | YES | YES | 10 |
| 14 | 43 | A | A | NO | NO | 0 |

826 — TOTAL THIS PERIOD                                                      10

FIG. 8

ENTITY A

| | 904 ASSET | 906 MATURITY | SIMULATION PERIOD 908 BEGINNING RATING | 910 ENDING RATING | 902 912 PREVIOUS DRAW | 914 CONTINUING DRAW | 916 DRAW THIS PERIOD |
|---|---|---|---|---|---|---|---|
| | 1 | 59 | AA | AA | NO | NO | 0 |
| | 2 | 47 | A+ | A+ | NO | NO | 0 |
| | 3 | 59 | AA+ | AA+ | NO | NO | 0 |
| | 4 | 53 | A- | A- | NO | NO | 0 |
| | 5 | 59 | A- | A- | NO | NO | 0 |
| | 6 | 47 | AA | AA | NO | NO | 0 |
| 922— 918— | 7 8 | 47 47 | BBB+ BBB | BBB+ BBB | NO NO | NO NO | 10 0 |
| | 9 | 35 | A | A | NO | NO | 0 |
| | 10 | 59 | A+ | A+ | NO | NO | 0 |
| | 11 | 53 | AA | AA | NO | NO | 0 |
| 920— | 12 13 | 35 59 | AA BB- | AA BB- | YES NO | YES NO | 10 0 |
| | 14 | 42 | A | A | NO | NO | 0 |

924—TOTAL THIS PERIOD      20

FIG. 9

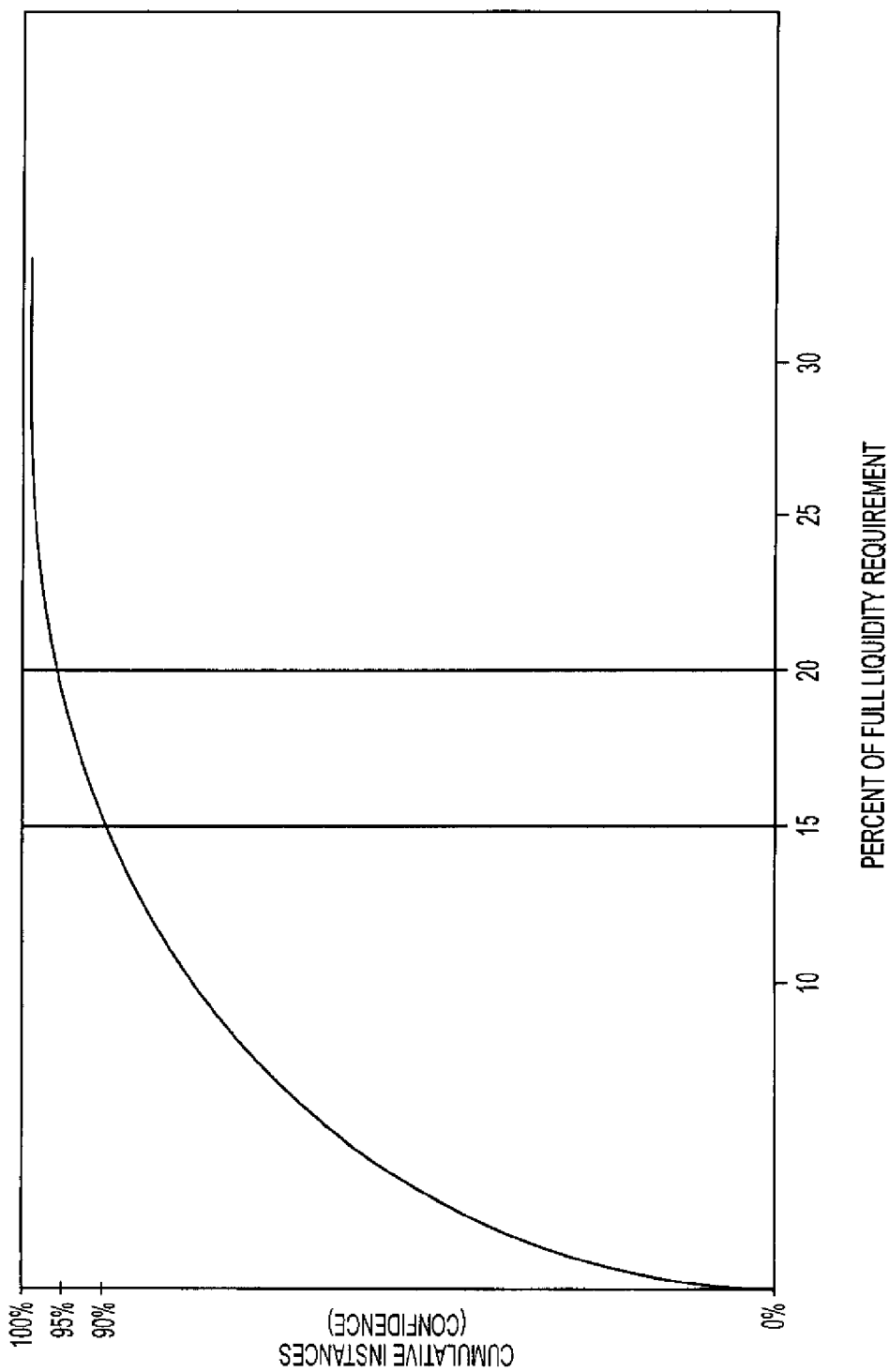

SYSTEM AND METHOD FOR ESTIMATING CONDUIT LIQUIDITY REQUIREMENTS IN ASSET BACKED COMMERCIAL PAPER

RELATED APPLICATIONS

This patent application is a Continuation of U.S. patent application Ser. No. 09/817,439 filed Mar. 26, 2001 now U.S. Pat No. 7,313,541, which claims priority to U.S. Provisional Patent Application No. 60/245,476, filed Nov. 3, 2000, which are hereby incorporated by reference in their entirety.

BACKGROUND

1. Field of the Invention

The present invention relates to a method and system for estimating the liquidity requirements for pools of assets. In particular, the present invention relates to a method and system for measuring the liquidity needs of pools of assets whose finding needs are related to their issuers' ability to access the commercial paper markets.

2. Description of the Related Art

As known to those of ordinary skill in the art, commercial paper ("CP") is a short term unsecured promissory note, typically issued by a corporation. Commercial paper offers a low-cost alternative to a bank loan, allowing the issuer to quickly raise finds without a complex or expensive Securities and Exchange Commission ("SEC") registration. As such, corporations rely on exemptions under the Securities and Exchange Act (such as under Section 3(a)(3) of the 1933 Act) to avoid the requirements for registration of their commercial paper. This exemption requires that the paper be a short-term security with certain characteristics. The maturity is limited to less than 270 days and the notes are of a type that is ordinarily not purchased by the general public. In practice this means that the notes have maturity of about 30 days, and minimum denominations are often between $100,000 and $1,000,000.

Because financing needs of the corporation often run beyond the typical 30 day maturity of commercial paper, the corporations need to roll-over the paper (i.e., issue new commercial paper on or before the maturity date), and have sufficient liquidity to satisfy the obligation if they are unable to roll-over the paper. The liquidity may be provided by bank lines-of-credit and cash reserves of the corporation.

Of course, as with any financial transaction, there are instances where the financial needs and credit-worthiness of a corporation changes (rating change) and the corporation is unable to roll-over the paper, or is required to pay the obligation from their cash reserves or draw on their line-of-credit. There are also instances where the corporations default on their commercial paper. As a result, there is historical data available to show probabilities of rating changes as well as the need for corporations to draw on their liquidity.

While corporations and other entities issue commercial paper as unsecured instruments, as described above, it is also known for entities to issue a form of commercial paper that is called asset-backed commercial paper. Asset backed commercial paper ("ABCP") ties the risk of the paper directly to the creditworthiness of specific financial assets, typically some form of receivable. These various known aspects of commercial paper and asset backed commercial paper are generally described in *ABCP Market: Firmly established and still expanding*, J. P. Morgan, May 23, 2000, (the disclosure of which is incorporated herein by reference).

At present, the liquidity needs of assets whose funding needs are related to their issuers' ability to access the commercial paper markets are met by financial guarantees and/or loan commitments sized at 100% of the related commercial paper program. Although diversification benefits exist across pools of these assets, financial institutions who provide these guarantees are unable to take advantage of these diversification benefits. As a result, in order to support the liquidity needs of a pool of these diverse assets, financial institutions must provide a very large amount of liquidity, i.e. 100% of the commercial paper programs of the supported assets. This is expensive and inefficient. Many financial institutions are reaching the limits of their ability to provide this liquidity.

It is known to provide less than 100% liquidity for certain ABCP. These known circumstances are strongly related to the underlying assets and performance characteristics of the underlying assets. Eureka! is an example of one such proposal. However, reduced liquidity is not available for all ABCP, or at least a much broader range of ABCP.

Methods and systems are needed to provide a means for assessing the true liquidity needs of pools of these assets. This allows for the more efficient use of the limited resource, i.e., the balance sheets of the financial institutions, resulting in lower costs, greater efficiency, and more supply of liquidity in the marketplace.

The preceding description and citation of the foregoing documents is not to be construed as an admission that any of the description or documents are prior art relative to the present invention.

SUMMARY OF THE INVENTION

In one aspect, the instant invention provides a method and system for managing liquidity requirements of asset backed commercial paper by determining a full liquidity requirement for commercial paper commitments of at least one financial institution, and determining ratings of assets backing the commitments. Then, determining probabilities of rating changes of the assets, and calculating a liquidity requirement for the commitments that is less than the full liquidity requirement for the commitments using at least the ratings and probabilities of rating changes.

In another aspect the instant invention provides a method and system for issuing asset backed commercial paper by receiving a liquidity commitment from at least one financial institution for a particular asset backed commercial paper issue. The liquidity commitment assures full liquidity for the particular commercial paper issue and represents less than full liquidity for a portfolio of asset backed commercial paper issues. The less than full liquidity is determined by ratings of the assets backing the portfolio and probabilities of rating changes of the assets backing the portfolio. Then, issuing the particular asset backed commercial paper.

In another aspect, the instant invention provides a method and system for investing in asset backed commercial paper, which has a liquidity commitment from at least one financial institution. The liquidity commitment assures full liquidity for the particular commercial paper issue and represents less than full liquidity for a portfolio of asset backed commercial paper issues. The less than full liquidity is determined by ratings of the assets backing the portfolio and probabilities of rating changes of the assets backing the portfolio. Then, redeeming the particular asset backed commercial paper.

In another aspect, the instant invention provides a method and system for providing liquidity commitments to asset backed commercial paper, where the liquidity commitment assures full liquidity for the particular commercial paper issue and represents less than full liquidity for a portfolio of asset backed commercial paper issues. The less than full liquidity is determined by ratings of the assets backing the portfolio and probabilities of rating changes of the assets backing the portfolio.

In another aspect, the instant invention provides a method and system for managing liquidity requirements of asset backed commercial paper by determining a full liquidity requirement for individual commercial paper commitments backed by a plurality of financial institutions, calculating a reduced liquidity requirement for the commitments, and allocating the reduced liquidity requirement among the institutions. Then, receiving shared liquidity assurances from the institutions for the individual commitments.

In another aspect, the instant invention provides a method and system for issuing asset backed commercial paper by receiving from a plurality of financial institutions, a shared liquidity assurance for a particular asset backed commercial paper issue, The shared liquidity assurance represents an allocation of less than a full liquidity requirement among the institutions. Then, issuing the particular asset backed commercial paper.

In another aspect, the instant invention provides a method and system for investing in asset backed commercial paper which has a shared liquidity assurance from a plurality of financial institutions. The shared liquidity assurance represents an allocation among the institutions of less than a full liquidity requirement. Then, redeeming the particular asset backed commercial paper.

In another aspect, the instant invention provides a method and system for providing liquidity assurance to asset backed commercial paper as a member of a plurality of financial institutions by providing a shared liquidity assurance for a particular asset backed commercial paper issue. The shared liquidity assurance represents an allocation among the plurality of institutions of less than a full liquidity requirement.

Thus, the instant invention advantageously provides assurance for full liquidity, without requiring full liquidity.

The foregoing specific aspects and advantages of the invention are illustrative of those which can be achieved by the present invention and are not intended to be exhaustive or limiting of the possible advantages that can be realized. Thus, the aspects and advantages of this invention will be apparent from the description herein or can be learned from practicing the invention, both as embodied herein or as modified in view of any variations which may be apparent to those skilled in the art. Accordingly the present invention resides in the novel parts, constructions, arrangements, combinations and improvements herein shown and described.

BRIEF DESCRIPTION OF THE DRAWINGS

The foregoing features and other aspects of the invention are explained in the following description taken in conjunction with the accompanying figures wherein:

FIG. 8 illustrates aspects of the instant invention in one embodiment;

FIG. 9 illustrates aspects of the instant invention in one embodiment;

It is understood that the drawings are for illustration only and are not limiting.

DETAILED DESCRIPTION OF THE DRAWINGS

Figure 18:
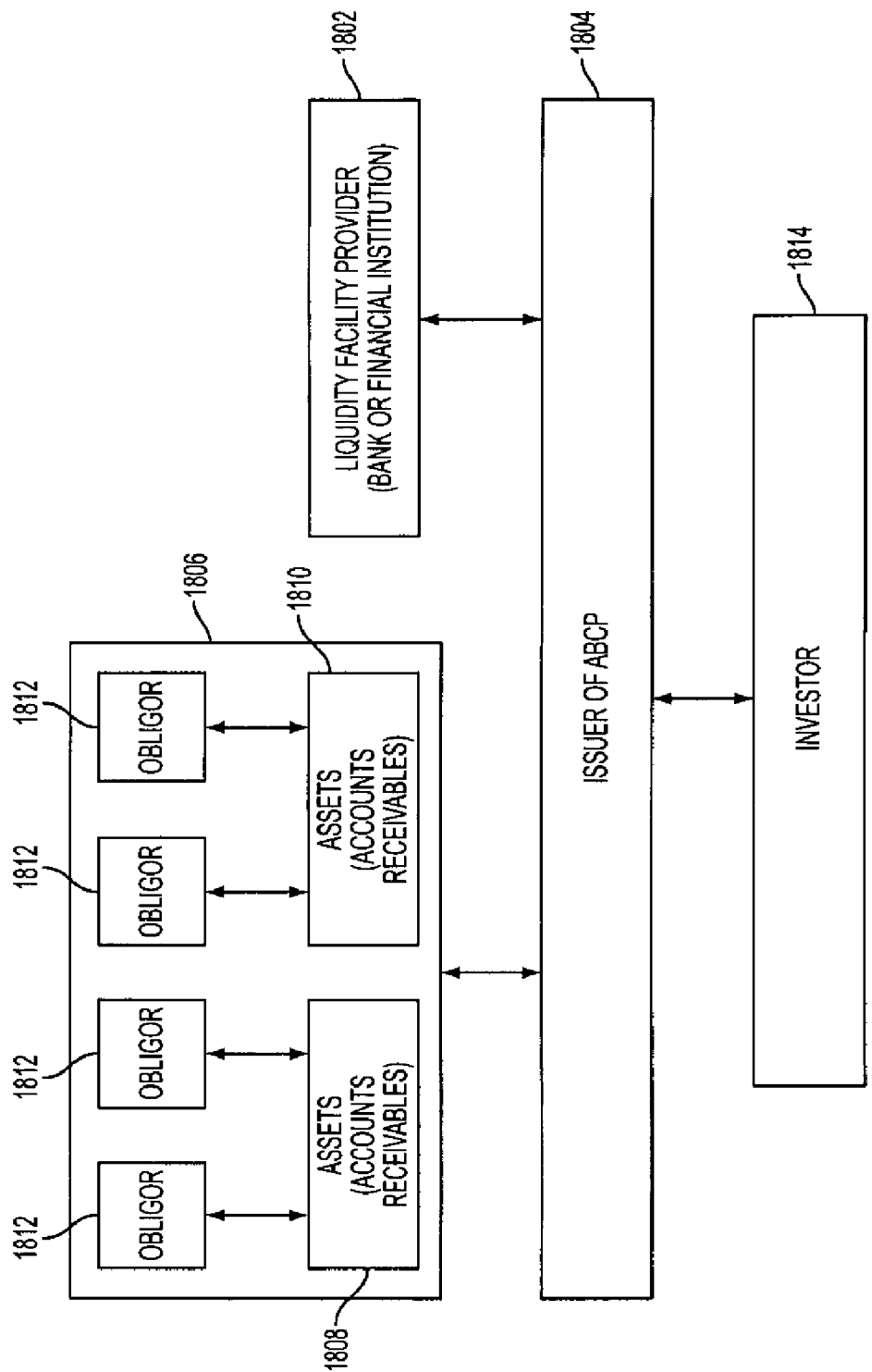
FIG. 18 illustrates an embodiment of an asset backed commercial paper program, as it is known in the prior art.

Referring to FIG. 18, a typical asset backed commercial paper (ABCP) program is illustrated. As it is known, banks or financial institutions (1802) provide liquidity commitments in the form of conduit liquidity to issuers of asset backed commercial paper (1804). These liquidity commitments serve as a back-up in the event that the issuers are unable to roll over their ABCP at maturity or pay off the ABCP with proceeds from the assets. The assets backing the commercial paper (1806) are frequently pooled and include various types of receivables, such as credit card receivables (1808) and mortgages (1810). These pooled assets have individual obligors (1812), who make payments that eventually flow to the issuer. The assets have respective credit ratings, which are established or determined by public rating agencies, such as Moody's. The issuers themselves (1804) also have a respective credit rating. Investors (1814) purchase the ABCP from the issuer (1804) and expect to receive at maturity a return of their principle with interest. At maturity, it is common for the issuer to roll the ABCP over, issuing new ABCP. This presupposes that the issuer (1804) will be able to access the CP market at or prior to maturity of the ABCP. Access to the CP market is highly dependent on the issuer's rating, and is also dependent on the rating of their assets (1806). If the issuer rating, or the asset rating declines, the issuer may be unable to access the CP market, and will therefore be unable to roll over their ABCP at maturity. In this event, in order to meet the requirements of the maturing ABCP, the issuer will need to draw on the liquidity commitments provided by the bank or financial institution (1802).

In general, without the instant invention, liquidity providers (1802) provide a full liquidity commitment (100%) for the ABCP issued to the investors (1814). This full liquidity is seldom needed or drawn against, but it has been provided because it was difficult to determine a reduced liquidity level that would reliably assure liquidity.

Where liquidity is needed or drawn, there are probabilities associated with a new draw against the liquidity commitment, a continued draw after a previous draw and an extent of liquidity draw. However, without the instant invention, these probabilities are not considered in establishing the required liquidity for ABCP. Similarly, there are probabilities associated with default of the banks or institutions providing the liquidity commitments. However, without the instant invention, these probabilities are also not considered in establishing the required liquidity for ABCP.

With this background, the present invention provides a system and model to perform simulations of events in order to determine the likely extent of liquidity funding needs, and thereby determine a reduced liquidity level with an assurance that the reduced level can reliably satisfy any liquidity needs. The reduced liquidity funding level determined by the instant invention is a percentage of and is less than the full (100%) liquidity requirement of the issuers.

As thus stated, the funding needs of the underlying assets are related to their issuers' ability to access the commercial paper markets. In turn, the issuers' ability to access the commercial paper markets is strongly related to the public rating agencies' credit rating of the issuers. These ratings may vary over time, and are a publicly recognized reflection of the creditworthiness of the issuers.

There are at least three basic embodiments of the instant invention, with variations of each embodiment. In one basic embodiment, all assets are considered to be of the same class, and are modeled as such. In another basic embodiment, the assets are considered to be individually unique, and are modeled as such. Finally, in another basic embodiment, the banks or institutions providing the shared liquidity commitments are considered to have probabilities of default or failure, and are modeled as such.

When the results provided by the present invention are incorporated into the financial structure of a special purpose vehicle, financial institutions providing liquidity to the underlying assets are able to realize the diversification benefits of the pool. In this manner, the invention allows reliance on a group of financial institutions to provide liquidity facilities to the underlying assets.

A System According to the Instant Invention

Figure 1:
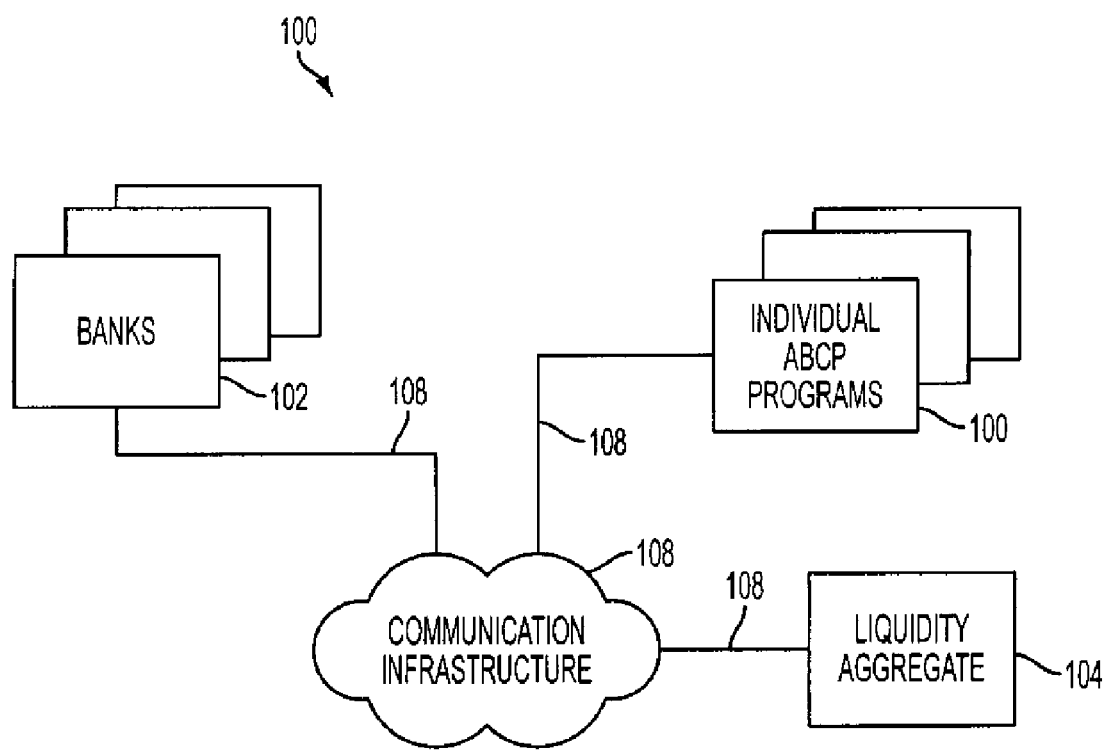
FIG. 1 illustrates an embodiment of a system according to the instant invention.

Referring to FIG. 1, an embodiment of system 100 of the instant invention includes a plurality of banks or institutions 102, with associated liquidity commitments to issuers of ABCP. These banks or institutions 102 are electronically connected to provider of aggregate liquidity 104. Banks 102 and provider of aggregate liquidity 104 are electronically connected to individual ABCP programs 106. Although not illustrated, the individual ABCP programs include issuers of the commercial paper, the assets backing the ABCP, and the investors purchasing the ABCP.

The electronic connections and communication infrastructure 108 are any of a number of different types of wired and wireless connections and in one embodiment includes the Internet.

Figure 2:
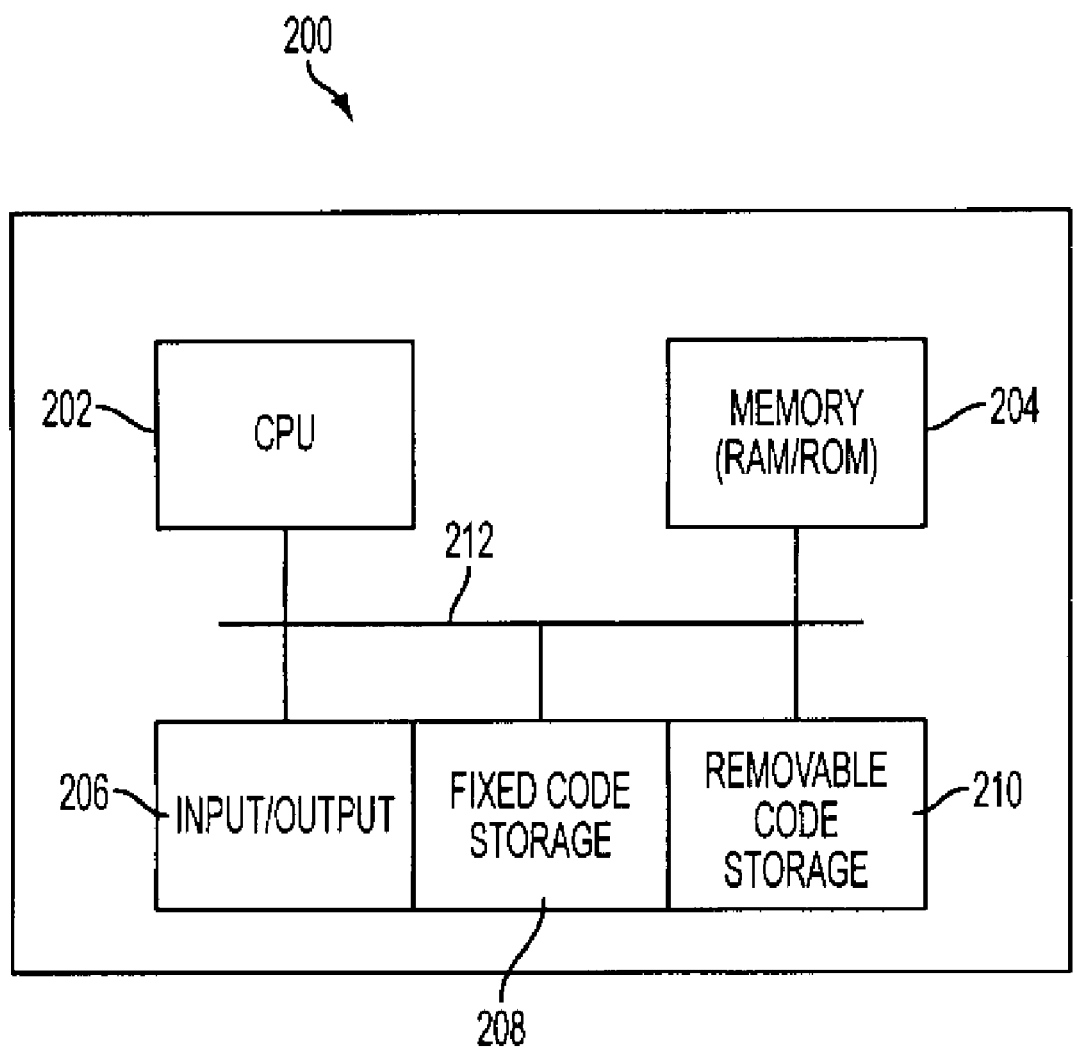
FIG. 2 illustrates an embodiment of elements of a system according to the instant invention.

Each of banks or institutions 102, provider of aggregate liquidity 104 and individual ABCP programs 106 include computer systems 200, an example of which is illustrated in FIG. 2. Computer system 200 includes individual components such as: central processor 202; memory 204; input/output 206; fixed code storage 208; and removable code storage 210. The individual components are interconnected by system bus 212

A Method According to the Instant Invention

Figure 3:
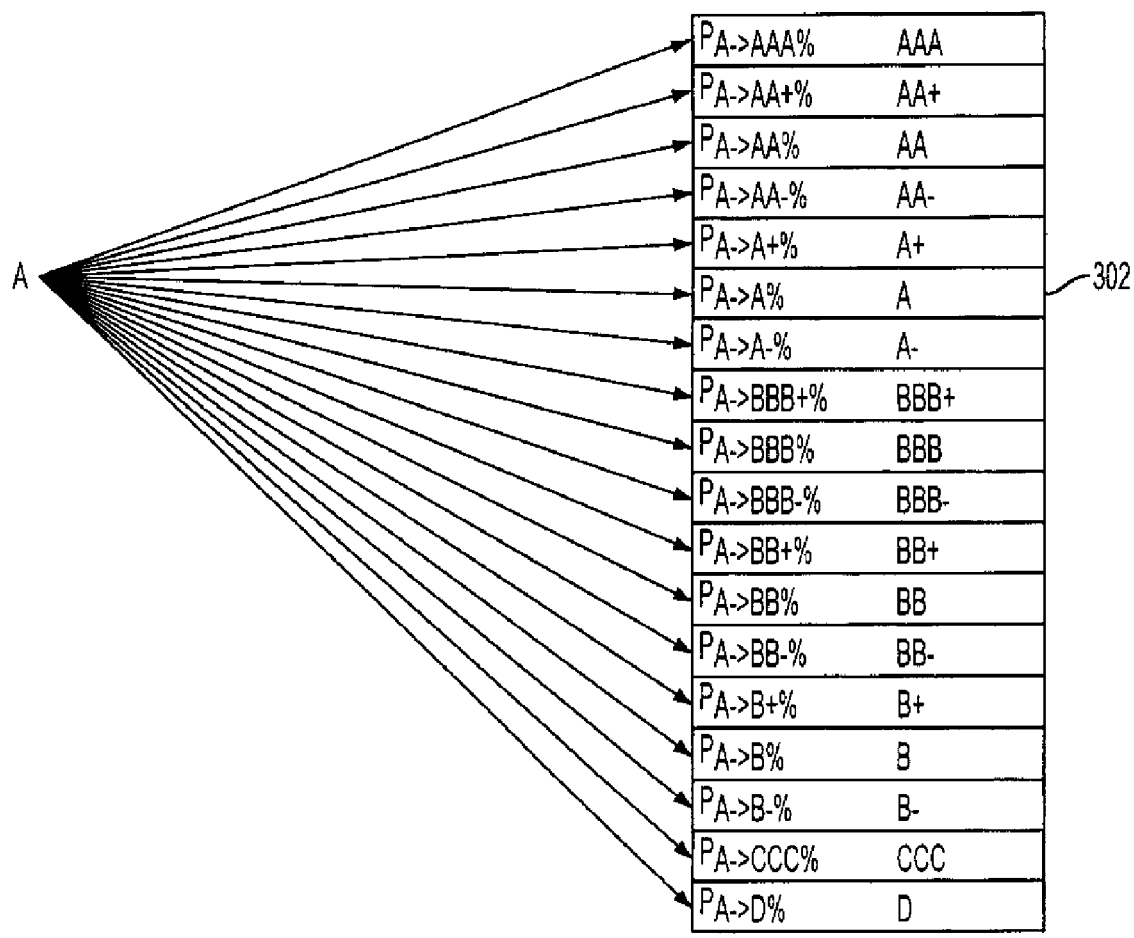
FIG. 3 illustrates a ratings transition matrix according to an embodiment of the instant invention.

Historical statistics regarding the likelihood of public rating agency rating upgrades and downgrades over time have been assembled by many parties, and are known as rating transition matrices. FIG. 3 illustrates one such rating transition matrix. Assuming that an issuer's current public rating is A (302), there is a probability associated with transition of that A rating to any other rating, including remaining at an A rating. These historic ratings migrations profiles can be used to predict the likelihood of future ratings upgrades and downgrades.

When the public rating agencies' credit rating of the issuer's credit rating is lowered (i.e. the issuer is downgraded), the issuer's ability to access the commercial paper markets is adversely effected. This makes it more likely that assets whose funding needs are related to the issuer's ability to access the commercial paper market will "draw" on the liquidity facility provided by the financial institution.

According to one embodiment of the instant invention, the ratings transition matrix specifies the probability of an entity in any given rating category moving to any other rating category over the course of a given month. These statistics have been published by the various public ratings agencies and are generally available. The instant invention is based on an assumption of monthly simulations, and therefore a ratings transition matrix developed on a monthly basis is required. Where the ratings transition matrix is known on an annual basis, it is possible to reduce the annual matrix to its 12' h root (and therefore convert it to a monthly basis). This is accomplished by:

$$i := 0 \ldots 7, j := 0 \ldots 7,$$
$$v_{i,j} := eigenvec(M, eigenvals(M)_i)_j,$$
$$k3_{i,i} := (eigenvals(M)_i)^{\frac{1}{numyears}}$$
$$M\_One := v \cdot k3 \cdot v^{-1}$$

where:

M is the annual ratings transition matrix;

M_One is the matrix reduced to a shorter time frame (one month);

numyears is the number of periods of reduction (here 12) when reducing the annual matrix to a monthly basis;

eigenvec represents the process of taking the eigenvectors of a matrix; and eigenvals represents the process of taking the eigenvalues of a matrix.

Figure 4:
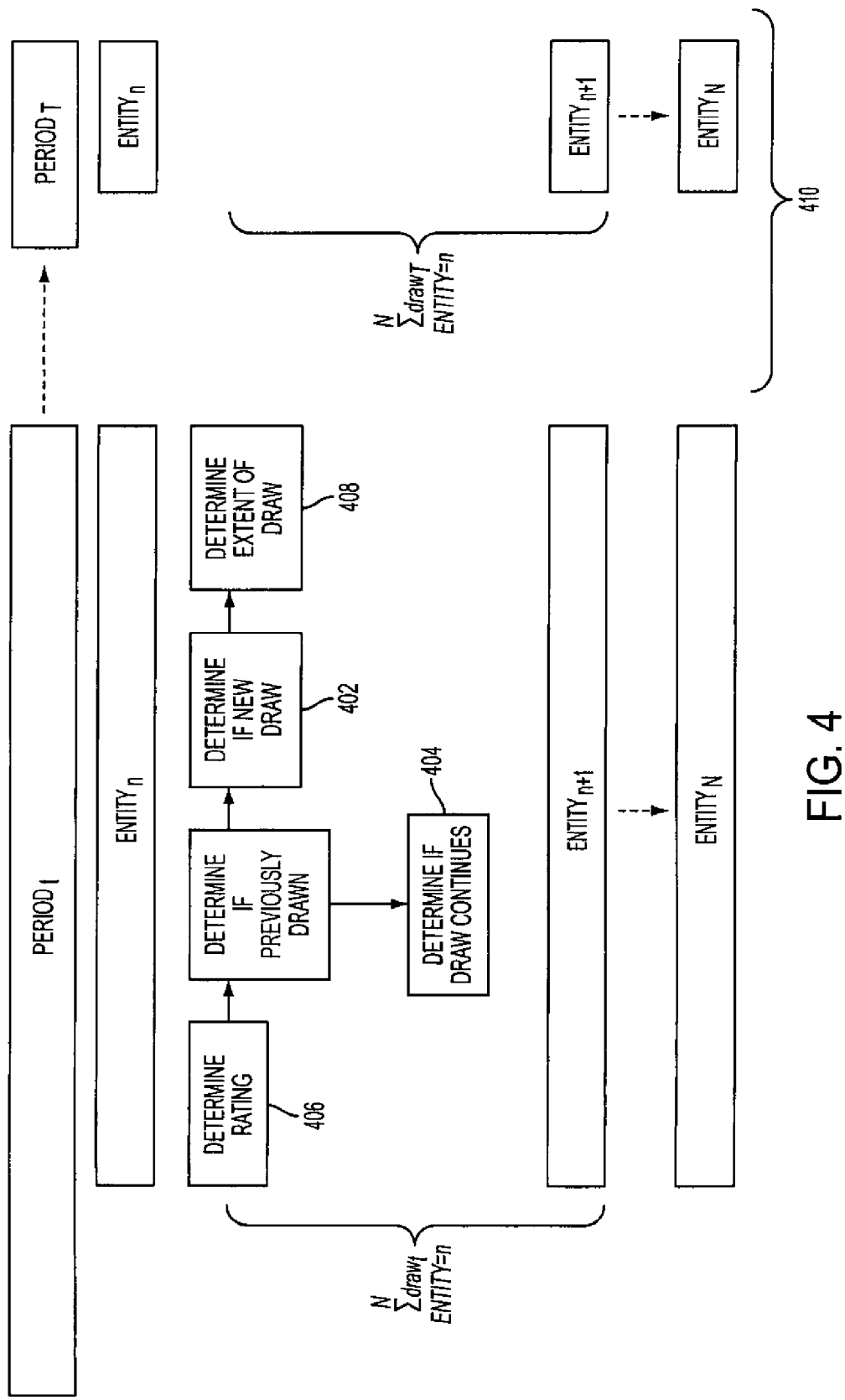
FIG. 4 illustrates a model flowchart according to an embodiment of the instant invention.

Referring to FIG. 4, the method of the invention makes use of the strong relationship between funding needs (i.e., draws on liquidity facilities) and issuer ratings to predict future funding needs by predicting possible future ratings. Given the rating at each point in time, the probability of a new draw (402) is simulated, as well as the continuation of existing draws (404), and the extent (i.e., the amount or percent) of any given draw. The results of the simulation allow the generation of a distribution of probable draw amounts, and the specification of the likelihood of the draw amount. This allows the sizing of the required liquidity facility.

The method of the invention also determines the necessary characteristics of a group of financial institutions or banks which can provide liquidity facilities to the pool of underlying assets. In this aspect, the invention determines the confidence that the described group of financial institutions will be able to honor their obligations to provide a given level of funding to the pool of underlying assets, This is based on the amount of liquidity provided by each institution or bank, the public rating agencies' rating of each institution or bank and the number of institutions or banks.

To determine the probability of a liquidity draw in each rating category, the system and method use a database of bank commitment experience to form the source for these calculations. The system and method then assemble dates of commitment origination, amounts of commitment and draw experience on a monthly basis. The system and method then estimate the liquidity draw probability statistics by observing the percentage of corporate commitments that have historically been drawn, arranged by rating category. Thus, the system and method simply take the average percentage in each rating category, observed with at least a monthly frequency. To develop confidence in the results, a long time frame is observed (e.g., seven or more years). Also, commitments which represent commercial paper backstop facilities are most appropriate for consideration.

Once the various probabilities of liquidity draw are determined, the system and method prepare the statistics by creating a histogram of the statistics. This histogram is arranged to specify the percentage of total observations of liquidity draws that fall in each percentile. For example, the histogram may specify what percentage of observed cases represent draws of 0-10% of the committed amount to that counterparty. Likewise, the system can specify how frequent 10-20%, 20-30%, etc. liquidity draws are in the historical database.

The system and method also access the historical commitment database to determine the probability of continued liquidity draw, once drawn. For each rating category, the system and method observe all monthly datapoints during which a liquidity draw existed. Then, the system and method tabulate the percentage of the time that a liquidity draw was followed in the next monthly period by a continued liquidity draw. The system and method tabulate these percentages for each rating category.

In certain embodiments described in greater detail elsewhere, the system and method require estimates of asset correlation, where a correlation of 100% represents identical characteristics and a correlation of 0% represents no common characteristics. In one embodiment, these asset correlations are similar to stock price correlations. It is known that correlations of returns among the stocks in the S&P 500 have varied widely over the last 20 years, from lows in the range of 20% to highs upwards of 50%. The system and method determine similar correlations for the assets backing the commercial paper.

In one embodiment, the correlation parameter represents the asset return correlation between the underlying securities representing asset backed commercial paper. As these securities are themselves diversified pools of assets with stable characteristics, these asset correlations are likely to be relatively low. These correlations are not likely to be directly observable, so guidance is drawn from general observations of the market at large, or from the public rating agencies who perform analyses on assets of these sorts.

Referring again to FIG. 4, the invention considers each time period t from 1 to T, (where a time period is a month and the total time is typically 5 years, or 60 months). For each of these time periods, the instant invention models several parameters for each of N entities.

Ratings Transition Simulation (406): This aspect of the invention starts by determining the current rating of the entity, This process involves a Monte-Carlo simulation of asset returns, which are mapped to ratings transition thresholds through the use of the previously described historical ratings transition matrices. This provides the probabilities of transition from any rating category to any other rating category for a given period.

Continuation of Draw Simulation (404): This aspect of the invention determines whether the particular entity's liquidity facility was in the "drawn" state in the previous period. If so, the model simulates the extension or termination of that liquidity draw.

New Draw Simulation (402): If the liquidity facility was not drawn in the previous period, the invention simulates the possibility of a new liquidity draw.

Extent of Draw Simulation (408); If, in the particular period, there is a new liquidity draw, the invention determines the extent of that liquidity draw.

Summation and Compilation (410): Finally, the results for many simulated periods are assembled and the invention determines the total liquidity draw requirements. For each of T periods, the total liquidity draw is determined, and stored. The maximum liquidity draw over the T periods is determined and represents one sample liquidity estimate. Many thousands, even tens of thousands of such simulations are performed, giving a distribution of possible outcomes. Given a desired level of confidence, a minimum or reduced liquidity requirement for the pool of assets can be determined from the distribution of outcomes.

These general aspects of the invention are described in greater detail below.

In one embodiment, all assets are considered to be of the same class. However, there may be instances where it is desirable to treat the asset classes differently. Accordingly, the invention also includes approaches for dealing with various asset classes:

Modeling Diverse Assets:

In one embodiment, the system and method of the instant invention use a modified ratings transition simulation to allow for the modeling of diverse asset classes, using multiple transition matrices. This embodiment is appropriate for cases in which there exist various asset classes within the pool of assets. These asset classes may have characteristics which necessitate the modeling of their ratings transitions separately.

There are at least two different techniques in this embodiment. One technique uses a "virtual asset portfolio" based on the "diversity score" of the actual assets. The other technique uses the explicit definition of the actual asset portfolio correlation and the actual asset portfolio, and does not therefore require the "diversity score" to generate a "virtual asset portfolio".

The use of multiple transition matrices is useful when the asset classes have characteristics such that the simulation requires separate modeling of their rating transitions. Therefore, the asset class of each asset or pool of assets is provided among the inputs to the model, and these inputs are used to determine which of several transition matrices are employed in the model.

A Virtual Asset Portfolio:

As one technique in modeling diverse assets, the virtual asset portfolio is based on the "diversity score" from the original asset portfolio. Using this virtual asset portfolio, the required inputs to the system and method are only the ratings and maturity of the virtual assets, with uniform size assumed.

The virtual asset portfolio is assumed to have an asset return correlation of zero, and hence zero ratings transition correlation. It is derived by computing a "diversity score" from the original exact asset portfolio. This "diversity score" is the result of a calculation that is provided by the public ratings agencies, and is a measure of the concentration of a portfolio. The score represents the number of members of a diversification-equivalent "virtual" asset portfolio, whose assumed asset correlation is zero and whose constituents have equal weightings in the portfolio. This is a convenient vehicle to simplify the required simulation process in the model, while providing consistency with the rating agency risk analysis approach.

The invention creates the virtual asset portfolio with the same ratings distribution as the original portfolio, and with a maturity associated with each "virtual" transaction that represents the distribution of maturities of like-rated assets in the original portfolio. Each asset is assumed to have an equal size.

Once the virtual portfolio is created, the system and method only need to know the rating and maturity for each asset of the virtual asset portfolio as inputs to the model.

An Actual Asset Portfolio:

As one technique in modeling diverse assets, the explicit or actual definition of asset correlation is used. This technique is different from the "virtual asset portfolio", and does not rely on the "diversity score". Instead, the characteristics of the original asset portfolio are provided as an input to the model. In this technique, the asset returns are assumed to be correlated, and are modeled using a market factor to which each asset in the portfolio is assumed to be correlated. This technique uses the following approach to generate the normally distributed asset return R.

$$R = \rho R_M + \sqrt{1-\rho^2}\epsilon,$$

where $R_M$ is a standard normal variable representing the market factor, $\rho$ is the square root of the average pair-wise asset correlations, and $\epsilon$ is a standard normal random variable.

Bank or Institution Failure: In one embodiment, the system and method consider characteristics required for a group of liquidity providers (e.g., banks and financial institutions), rather than a single provider, and probabilities that some members of the group of liquidity providers might fail or default.

This embodiment allows creation of a structure to employ the results of these models and also contemplates the formation of a group of financial institutions or banks to jointly provide liquidity to the underlying assets in the pool. The total size of the liquidity facility required is defined by the models described above. However, this requirement might not be simply split among a group of liquidity-providing financial institutions. Alternatively, the system and method take into account the possibility that one or more members of the group of financial institutions providing liquidity may be unable to meet their obligation to provide liquidity.

A model similar to the model above is employed to simulate defaults among the group of financial institutions or banks over the life of the transaction. For example, assume R is the asset return over a given period, and is normally distributed. We construct a threshold $Z_{Def}$ for R such that if $R<Z_{Def}$, the bank or financial institution is assumed to defaults In this model, we use the cumulative probability of default over the life of the transaction (e.g., five years) as reported by historical rating studies published by the ratings agencies. For example:

Probability of default=Probability $(R<Z_{Def})=\Phi(Z_{Def}/\sigma)$, where, $\Phi$ represents the cumulative normal distribution.

For example, we can use this relationship to define the threshold points as follows, $Z_{Def}=\Phi^{-1}$ (Probability of default), where, $\Phi^{-1}$ represents the inverse cumulative normal distribution.

R is generated as in the market factor model using the following construct:

$$R = \rho R_M + \sqrt{1-\rho^2}\epsilon,$$

where $R_M$ is a standard normal variable representing the market factor, $\rho$ is the square root of the average pair-wise asset correlations, and $\epsilon$ is a standard normal random variable.

By creating simulations of many thousands of transaction outcomes, we can create a histogram of the number of defaulting financial institutions in the liquidity provider group, as well as a dollar distribution of liquidity available. This allows the estimate of these parameters At Any Given Confidence Level.

A Basic Embodiment:

The different embodiments and techniques described above will be discussed in greater detail with reference now to FIG. 3. An issuer's publicly assigned credit rating may migrate from the current rating to one of many different ratings over time. The model envisions the simulation of these movements on a periodic basis, repeatedly over the life of the transaction. These movements are simulated using a Monte-Carlo approach, in which a normally distributed random variable represents the entity's asset returns over each period. The invention assumes that there are asset values that correspond to different credit ratings at each point in time.

Figure 5:
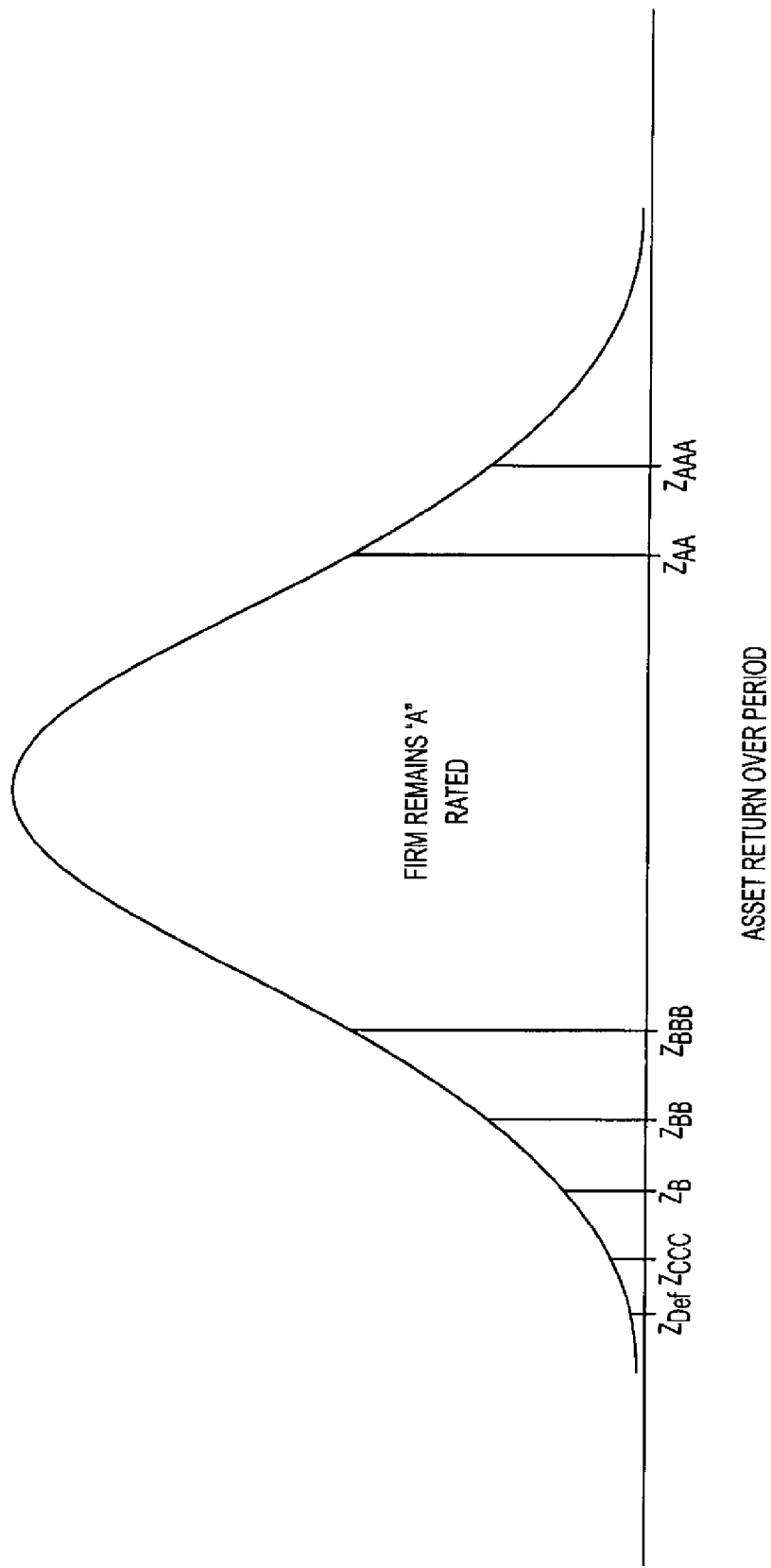
FIG. 5 illustrates a distribution of asset returns with rating change thresholds according to an embodiment of the instant invention.

As illustrated in FIG. 5, the normally distributed asset returns can be used to predict ratings transitions, by mapping different return levels to credit ratings transitions. By observing the likelihood of ratings transition from any rating category to any other rating category using the previously described historical ratings transition matrices, the invention maps the normally distributed asset returns to each possible ratings transition and defines thresholds for these transitions.

For example, assume R is the asset return over a given period, and is normally distributed. The invention constructs thresholds $Z_{Def}$, $Z_{CCC}$, $Z_B$, etc., for R such that if $R<Z_{Def}$, the entity is assumed to default. If $Z_B<R<Z_{BBB}$, then obligor is downgraded to BB, etc. For example:

Probability of default=Probability $(R<Z_{Def})=\Phi(Z_{Def}/\sigma)$, where, $\Phi$ represents the cumulative normal distribution.

For example, the invention uses this relationship to define a threshold point as follows, $Z_{Def}=\Phi^{-1}$ (Probability of default), where, $\Phi^{-1}$ represents the inverse cumulative normal distribution.

This approach is extended to define each of the asset return thresholds. Given the asset return thresholds, the normal random variable R, representing the asset returns for a given period, is used to determine the sample ratings transition for that entity for that period.

In one embodiment, the generation of the normal random variable R is very simple, as asset correlation is assumed to be zero through the use of the "virtual asset portfolio" based on the diversity score of the original asset portfolio. See the description above for a discussion of the "virtual asset portfolio".

Continuation of Draw Simulation: The invention also determines whether the particular entity's liquidity facility was in the "drawn" state in the previous period. If so, the model simulates the extension or termination of that draw. This is performed by comparing a uniformly distributed random variable with the probability of a continuing draw for the current rating category. The probability of a draw continuing is defined by historical analysis of like assets, with the same credit rating. Care must be taken to synchronize the historical data to the periodicity of the simulation (e.g., monthly historical data and monthly simulation path).

New Draw Simulation: Given that a particular entity's liquidity facility was not drawn at the beginning of a particular simulation period, the model simulates the possibility of a new draw occurring during that period. This is performed by comparing a uniformly distributed random variable with the probability of a new draw for the current rating category. The probability of a new draw is defined by historical analysis of like assets, with the same credit rating.

Figure 6:
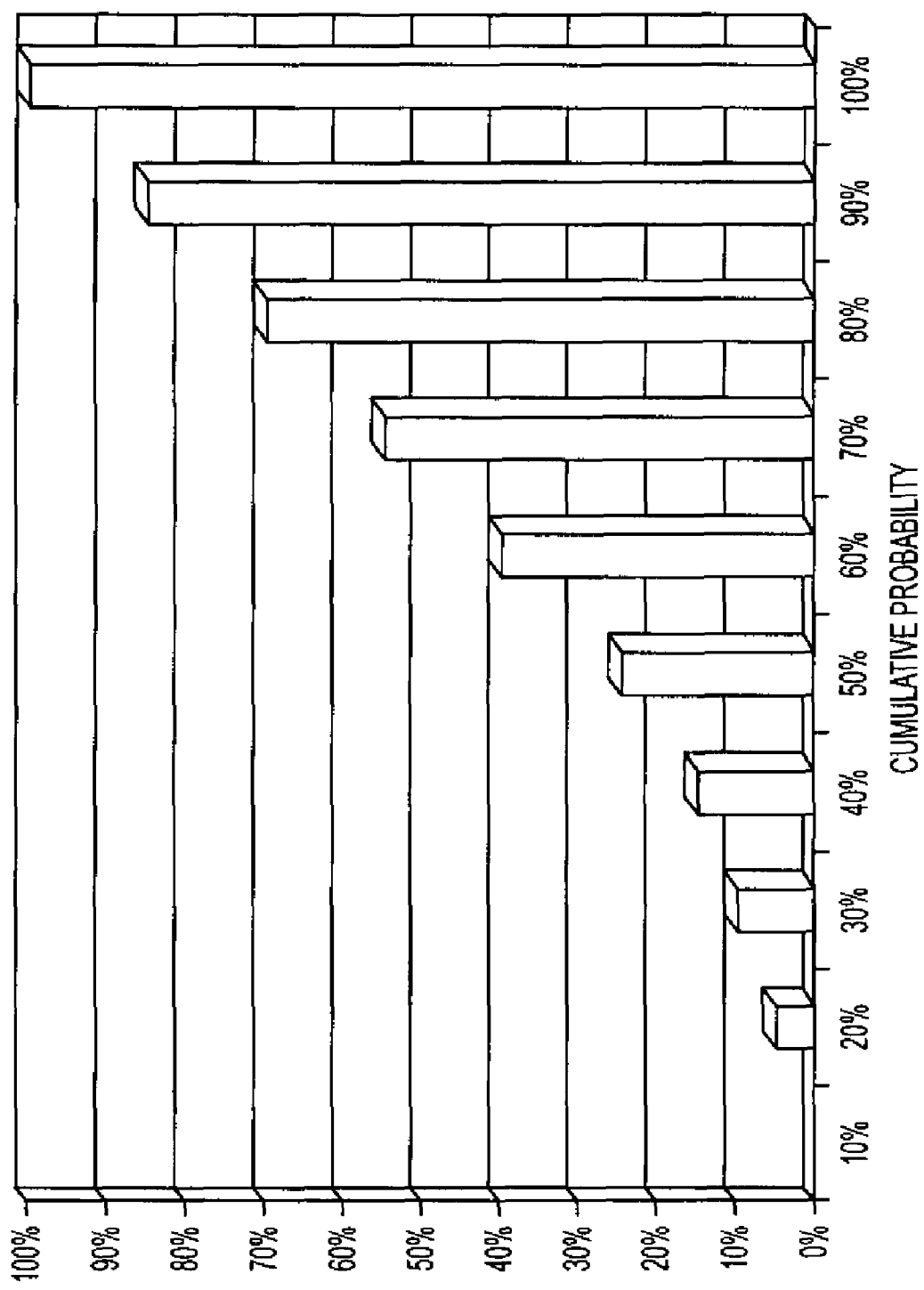
FIG. 6 illustrates an example of distribution of extent of draw on liquidity facilities according to an embodiment of the instant invention.

Extent of Draw Simulation: If, in the particular period, there is a continuing or a new draw, the extent of that draw is then simulated. In this case, there exists a unique distribution of possible draw amounts, represented as a percentage of the total liquidity facility provided to that entity. This unique distribution is determined by an examination of the historical draw history of like assets, of like credit rating. The distribution is described in an empirical manner, using an approach like that illustrated in FIG. 6.

The historical observations of extent of draw are assembled into deciles, from smallest to largest. A uniformly distributed random variable is then mapped to the deciles, allowing the simulation process to properly model the likelihood of various "extent of draw" outcomes.

Assembly and Analysis of Results: For each of the T periods, the total liquidity draw for each asset of the N assets, during each simulation period is determined and totaled to arrive at a total liquidity draw for the period. This total amount for the simulation period is then stored, The total draws over each of the T periods are then compared and the maximum liquidity draw is calculated. This maximum liquidity draw represents one sample liquidity draw estimate. Many thousands, even tens of thousands of such simulations are generated, giving a distribution of possible liquidity draw outcomes. This distribution is then analyzed and, given a desired level of confidence, a reduced liquidity requirement for the pool of assets is determined. To accomplish this, a sorting algorithm is employed. Levels of confidence are then related directly to observations of the corresponding (percentile) position in the sorted list of samples. Linear interpolation is employed to derive levels of confidence that may lie between sorted samples.

Figure 7:
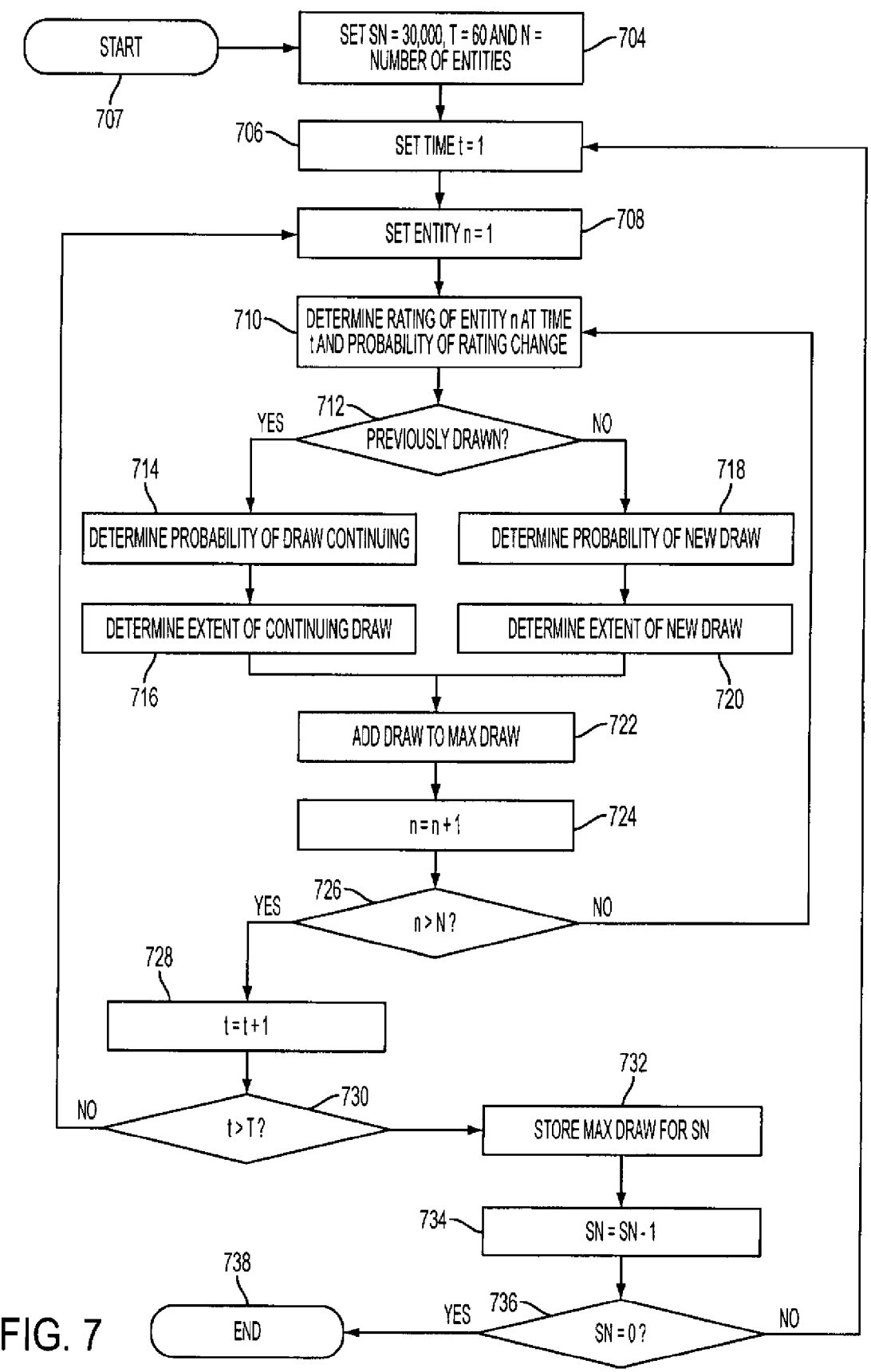
FIG. 7 illustrates an example of a method according to an embodiment of the instant invention.

Referring to FIG. 7, an embodiment of a method according to the instant invention is illustrated. At step 702, system 100 begins the method of the invention. At step 704, system 100 sets the number of Monte-Carlo simulation runs (SN), the number of time periods (T) and the number of assets or entities (N). In one embodiment, the number of Monte-Carlo simulation runs is 30,000, the number of time periods is 60 (months) and the number of assets or entities reflects the actual number of assets or pools of assets.

At step 706, system 100 sets a period counter (t) to 1, and at step 708, system 100 sets an entity counter (n) to 1.

At step 710, system 100 determines the rating of asset or entity n at time period t, and the associated probability of rating change during period t. As explained elsewhere in greater detail, the rating transition matrices may use a number of different possible embodiments and techniques.

At step 712, system 100 determines whether there was a liquidity draw for the asset during the previous simulation period. If so, then at step 714, system 100 determines the probability of the liquidity draw continuing, and if the liquidity draw continues, then at step 716 system 100 determines the extent of the continuing liquidity draw. In one embodiment the amount or percent of continuing liquidity draw is the same as the amount or percent of the previous liquidity draw.

In another embodiment, the amount of the continuing liquidity draw is determined just as a new liquidity draw.

If there was no previous liquidity draw, then at step 718, system 100 determines the probability of a new liquidity draw, and at step 720, system 100 determines the extent of the new liquidity draw.

If there was any new or continued liquidity draw, then at step 722, system 100 adds the amount of the draw to the cumulative total for the respective simulation period.

At step 724, system 100 adds one (1) to n to increment the asset counter.

At step 726, system 100 determines whether n is greater than N, which would mean that all assets have been considered during the simulation period, If n is less than or equal to N, meaning that more assets need to be considered for this particular simulation period, then system 100 loops to step 710, and continues the following steps so described.

If n is greater than N, meaning that all assets have been considered during this simulation period, then at step 728, system 100 adds one (1) to t to increment the simulation period counter.

At step 730, system 100 determines whether t is greater than T, which would mean that an entire 60 month series of Monte-Carlo simulation periods have been completed. If t is not greater than T, then system 100 loops to step 708, and continues the following steps so described.

If t is greater than T, meaning that an entire 60 month series of Monte-Carlo simulation periods have been completed, then at step 732, system 100 reviews the maximum liquidity draw for each simulation period, and stores the maximum liquidity draw for the Monte-Carlo simulation.

At step 734, system 100 subtracts one (1) from SN, to decrement the Monte-Carlo simulation counter.

At step 736, system 100 determines whether SN, the simulation counter, is equal to zero. If not, then system 100 loops to step 706, and continues the following steps so described.

If SN is equal to zero, then at step 738, system 100 ends the simulation by storing and then presenting an indication of the respective liquidity draw for each of the SN simulations.

An Example of the Instant Invention

In the following example, the invention determines the probabilities of liquidity draw and extent of the draw for a number of banks and their respective commitments.

In FIG. 8, at the beginning of the simulation model, one of the entities (Entity A) has 14 assets (802), each asset with a respective maturity (804) and rating (806) at the beginning of the model period. The simulation, or model will progress over 60 simulation periods, corresponding to 5 years. FIG. 8 is the state at the beginning of the first simulation period (808).

Figure 10:
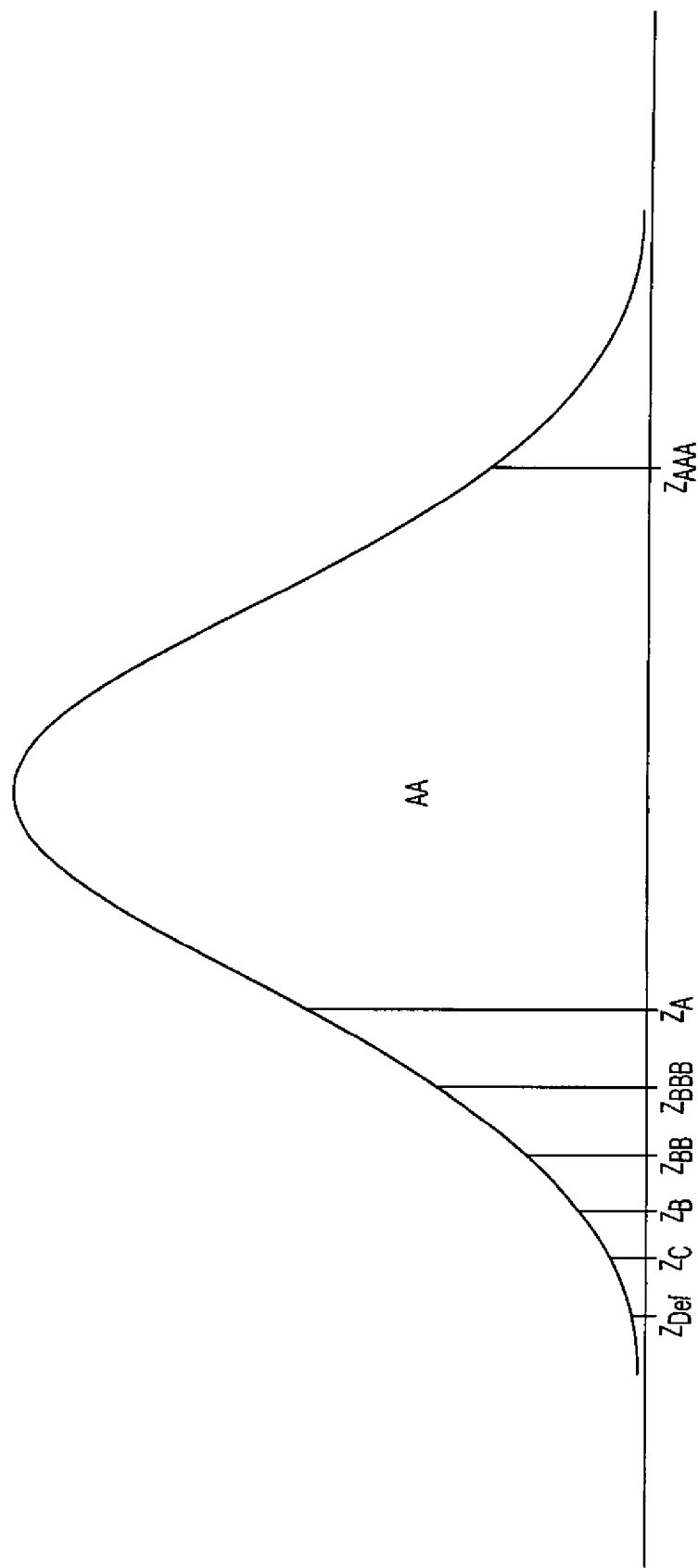
FIG. 10 illustrates aspects of the instant invention in one embodiment.

For each of the assets that has a rating, there is a respective ratings transition matrix. For example, asset 1 (810) has a rating of AA at the beginning (806) of simulation period 1. Referring to FIG. 10, we find the respective ratings transition matrix for an asset that has a rating of AA. As FIG. 10 illustrates, there is a high probability that the asset will remain rated AA, as compared to changing to a rating of A or AAA, or any other rating. Using a Monte-Carlo technique, and the ratings transition matrix, the model determines what the rating for that asset will be at the end (812) of the simulation period. For most assets the rating does not change. However, for some assets, the rating will improve, or decline. Thus, asset 5 (814), which begins the simulation period with a rating of BBB+, ends the simulation period with a rating of A−(an improvement). Alternatively, asset 7 (816), which begins the simulation period with a rating of A−, ends the simulation period with a rating of BBB+(a decline).

Figure 11:
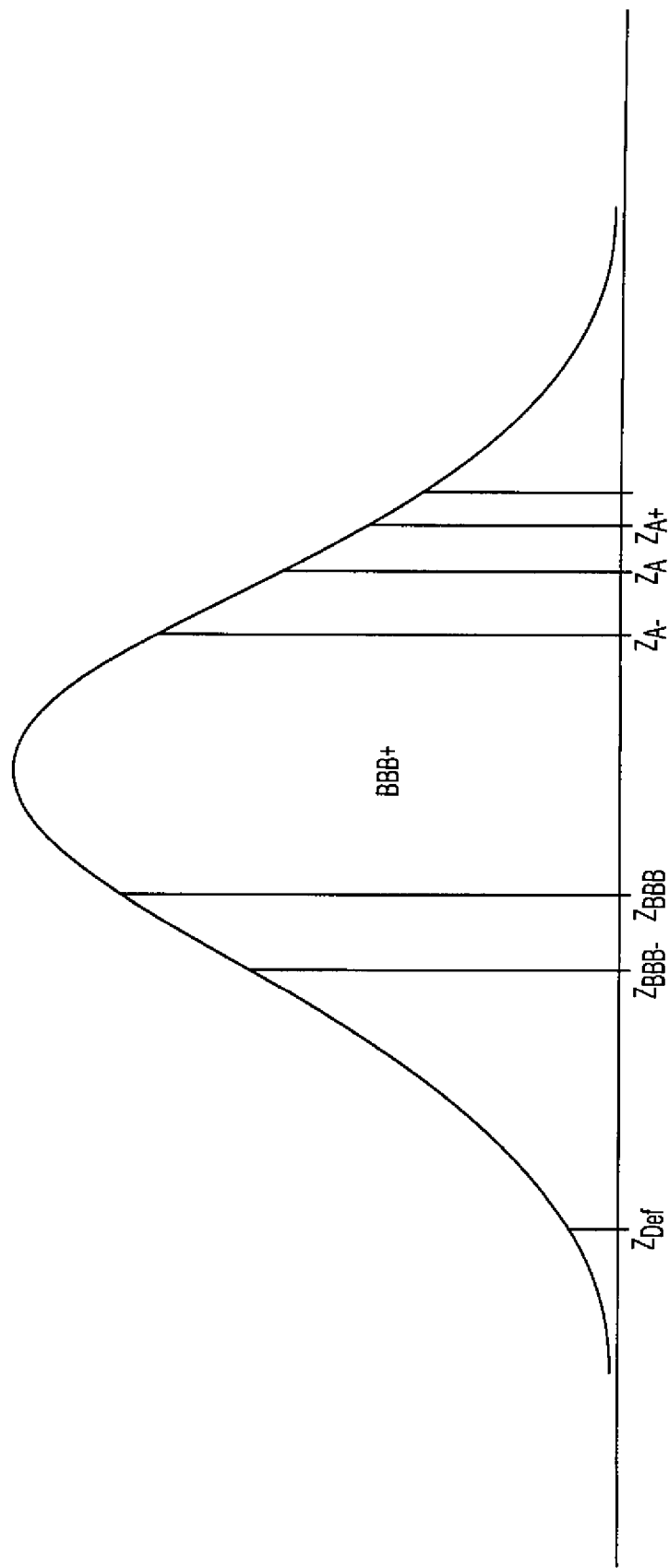
FIG. 11 illustrates aspects of the instant invention in one embodiment.
Figure 12:
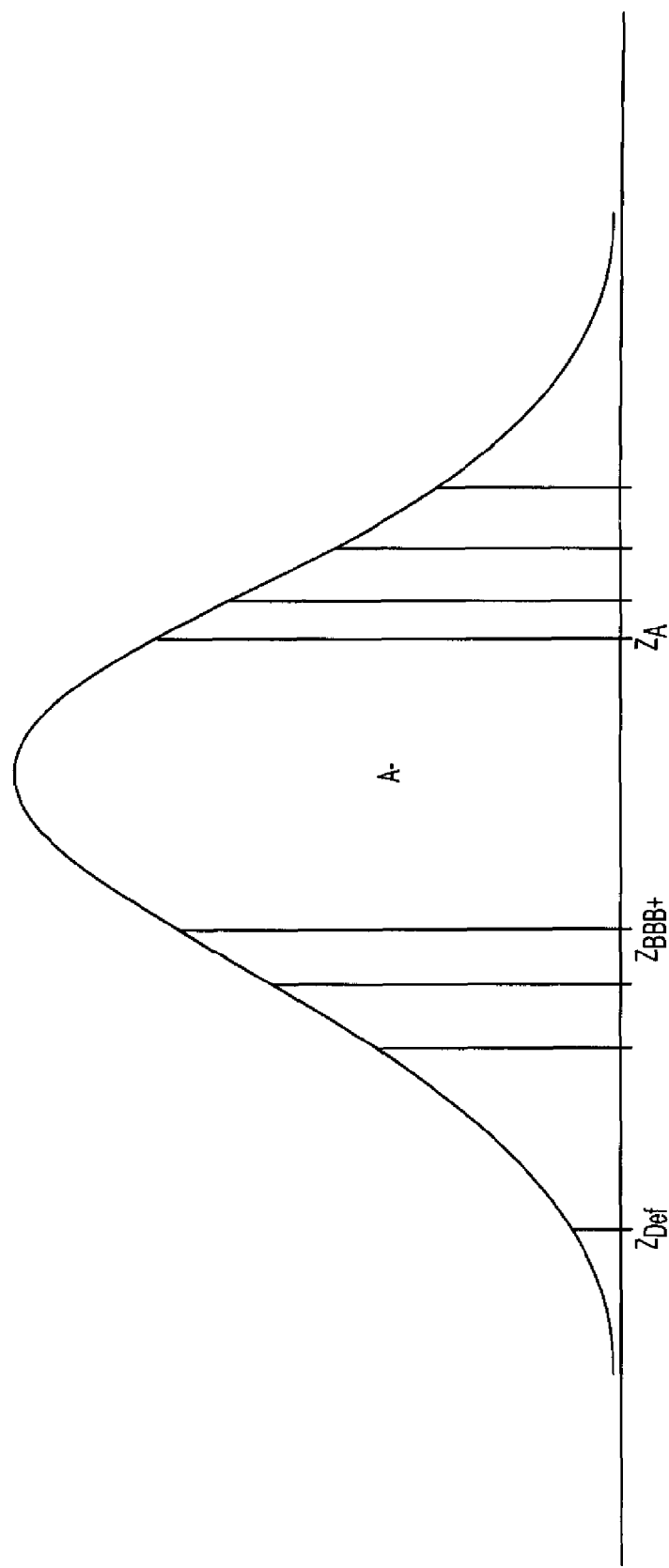
FIG. 12 illustrates aspects of the instant invention in one embodiment.

The respective ratings transition matrix for asset 5 is illustrated at FIG. 11, while the matrix for asset 7 is illustrated at FIG. 12.

Figure 13:
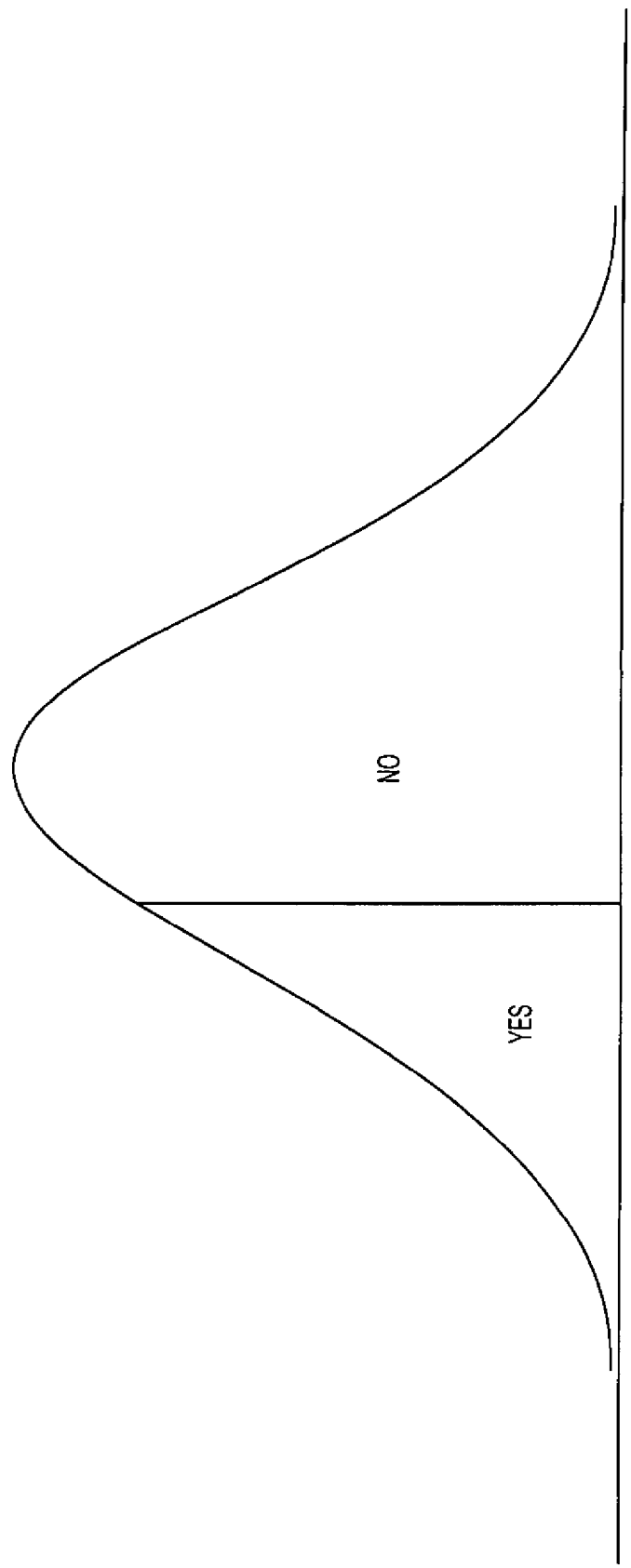
FIG. 13 illustrates aspects of the instant invention in one embodiment.

After the model determines any ratings transition during the simulation period, the model determines whether there was a liquidity draw during the previous period (818). If there was a liquidity draw in the previous period, the model determines the probability of a continuing liquidity draw over the current simulation period, For this, the model uses a similar probability distribution, such as illustrated in FIG. 13. For example as illustrated, if there was a liquidity draw in the previous simulation period, there is a probability that the liquidity draw will continue in the next simulation period, and also a probability that the liquidity draw will not continue. Using the same Monte-Carlo technique described above, the model determines whether the liquidity draw continues (819). Thus, in FIG. 8, assets 8 (820) and 13 (822) both had previous liquidity draws before the beginning of simulation period 1. However, the Monte-Carlo simulation determines that only asset 13 has a continuing liquidity draw at the end of simulation period 1.

Figure 17:
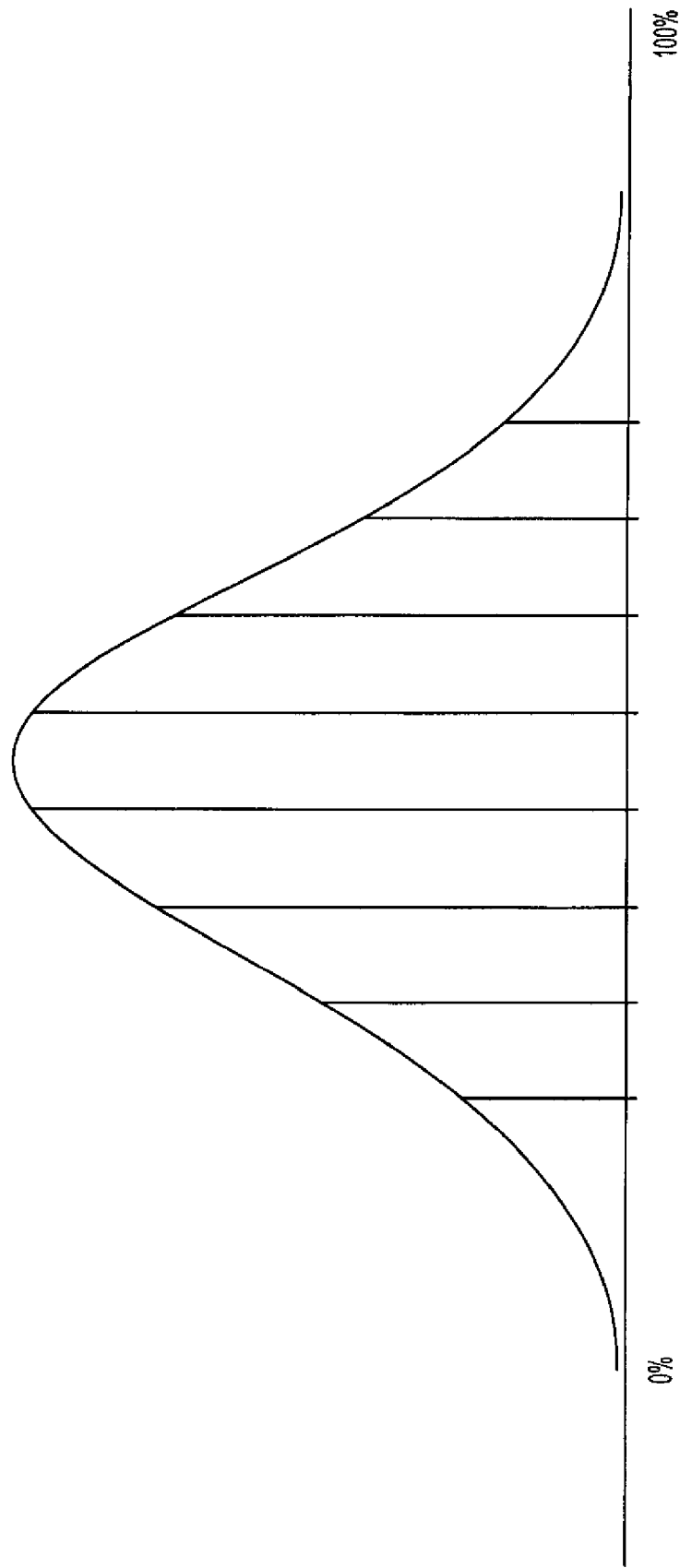
FIG. 17 illustrates aspects of the instant invention in one embodiment.

If the draw continues, the model then determines the extent of the liquidity draw. In one embodiment the extent of a continuing liquidity draw is the same as the previous liquidity draw. Alternatively, in another embodiment, as illustrated in FIG. 17, the Monte Carlo technique determines the extent of the liquidity draw, in a similar manner as described above.

Figure 14:
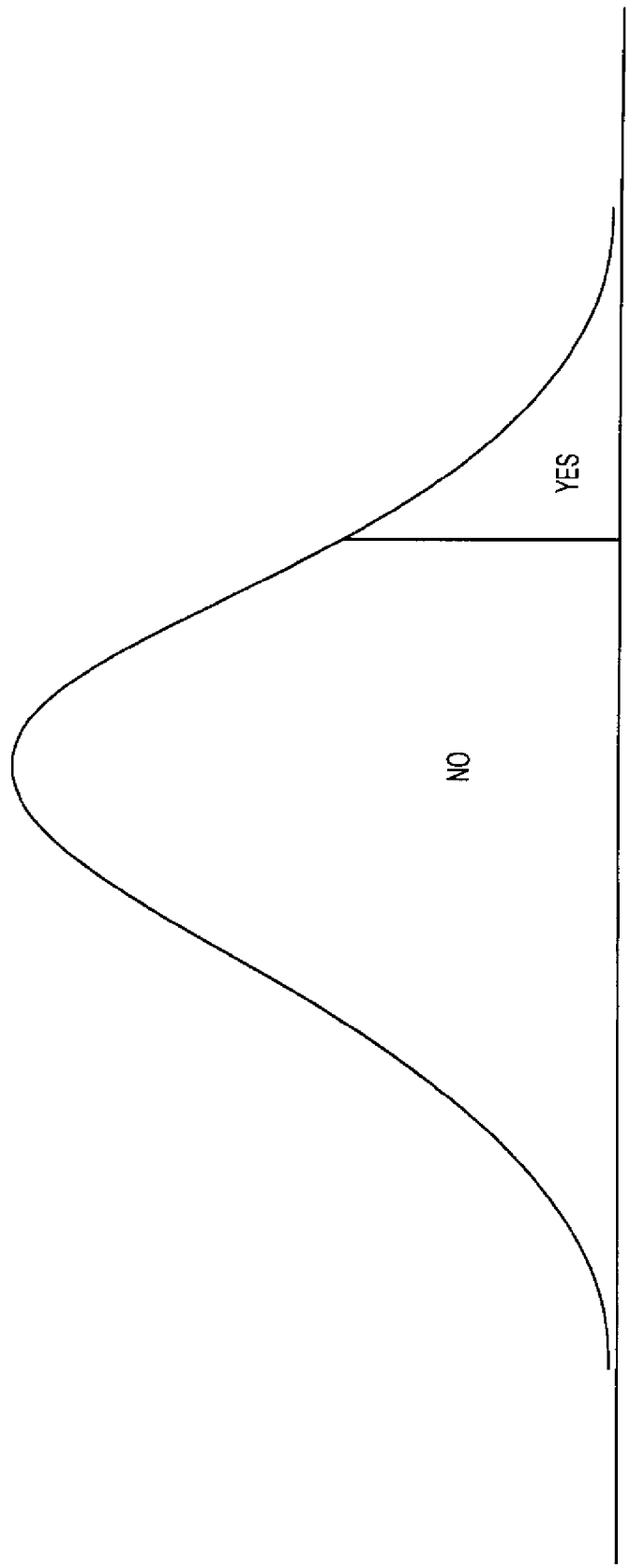
FIG. 14 illustrates aspects of the instant invention in one embodiment.

If there was no liquidity draw in the previous simulation period, then using the Monte-Carlo technique, the model determines whether there is a new liquidity draw over the current simulation period. This is accomplished in a similar manner, such as illustrated in FIG. 14. Here, we see that there is a small probability that a new liquidity draw will occur, and a much larger probability that no new liquidity draw will occur.

Figure 15:
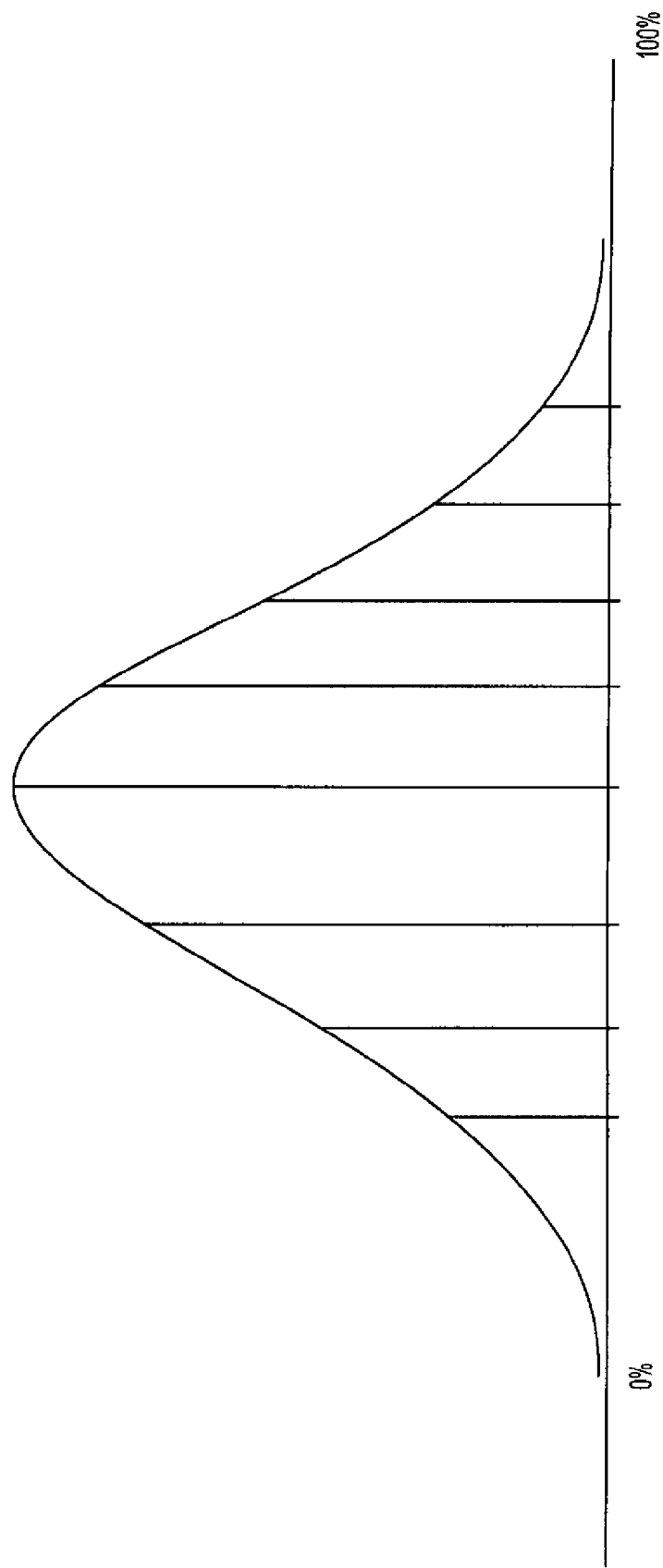
FIG. 15 illustrates aspects of the instant invention in one embodiment.

If there is a new liquidity draw, the model then determines the extent of the liquidity draw. In FIG. 15, the Monte-Carlo technique determines the extent of the liquidity draw, in a similar manner as described above.

The amounts of any continued liquidity draw and new liquidity draw for the particular asset, are calculated for the period (824), and the amounts for that period are totaled across all assets of the entity (826).

This Monte-Carlo process is repeated for each asset of each entity over the simulation period. After calculating liquidity draw and liquidity draw amounts, information such as illustrated in FIG. 8 is saved. Using this information at the end of the first simulation period, the model starts the second simulation period. FIG. 9 illustrates a second simulation period (902). The same assets (904) are illustrated in FIGS. 1 and 2, and the respective times to maturity (906) for the simulation period have been updated (since each asset is one month closer to maturity).

The beginning rating for each asset (908) is the same as the ending rating (812) from the previous simulation period. Using the same Monte-Carlo technique with the ratings transition matrix, an ending rating (910) is determined. A previous liquidity draw (912) is determined from the previous simulation period, and depends on whether there was a continuing liquidity draw or a new liquidity draw in the previous period. If there was no continuing liquidity draw or new liquidity draw in the previous simulation period, there is no previous liquidity draw in the current simulation period.

Asset 8 (918), which had a liquidity draw prior to simulation period 1, did not have a continuing liquidity draw during period 1 and therefore there is no previous liquidity draw (912) for asset 8 at the beginning of simulation period 2. However, we saw in FIG. 8 that asset 13 had a continuing liquidity draw (819) during simulation period 1, and therefore in FIG. 9, asset 13 (920) has a previous liquidity draw (912) at the beginning of period 2. We also see that asset 13 had a continuing liquidity draw (914) in simulation period 2, and the liquidity draw amount for simulation period 2 (916) is added to the total liquidity draw (924) for simulation period 2.

We further note that asset 7 (922) has a new liquidity draw in simulation period 2.

The steps just described are repeated for all of the assets of all of the entities for all of the simulation periods (60). When maturity of an asset is reached the asset is removed from the simulation.

Figure 16A:
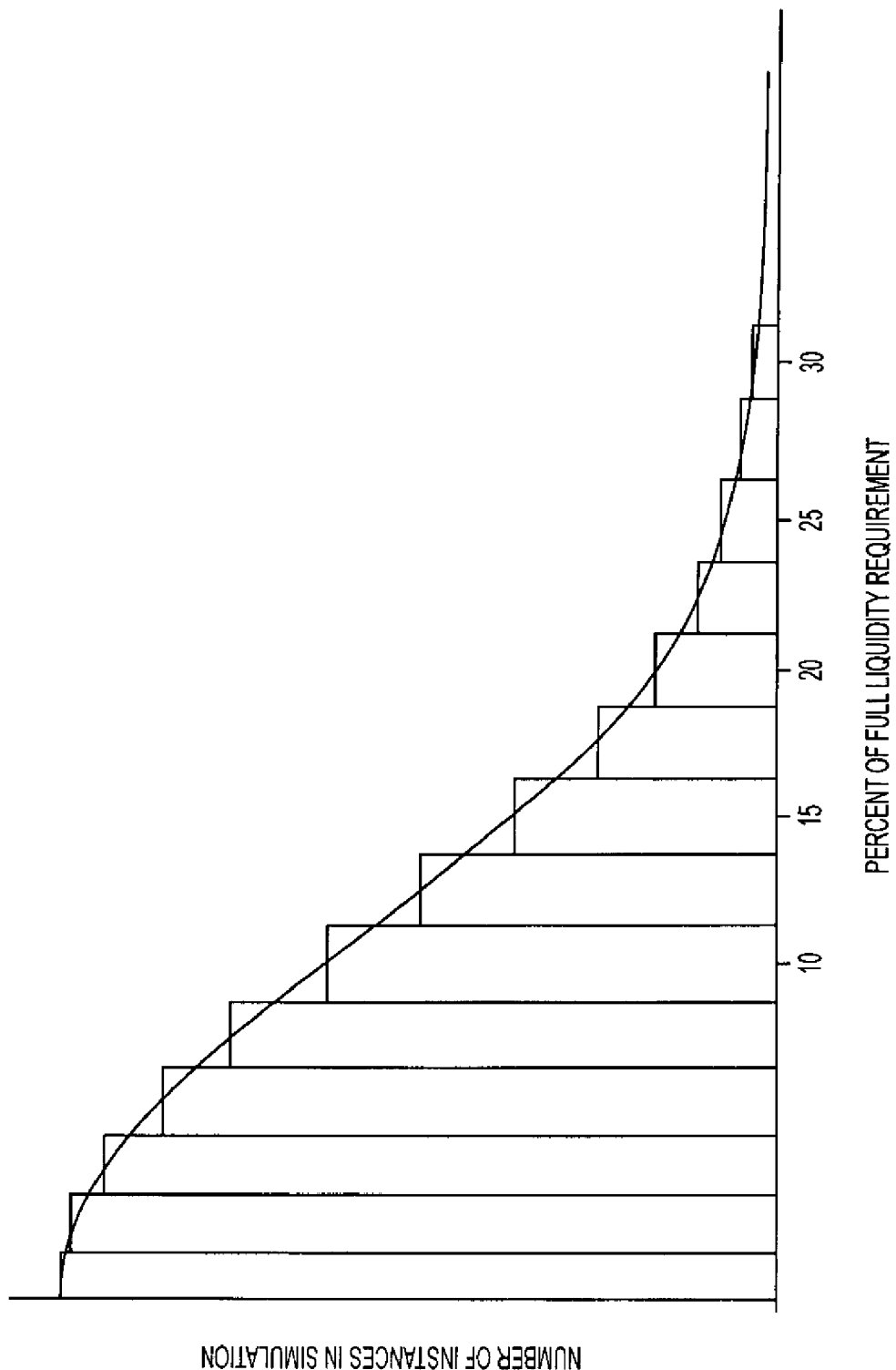
FIG. 16 illustrates aspects of the instant invention in one embodiment.

The liquidity draw amounts for each of the assets of each of the entities in each simulation period are totaled and the liquidity draws of all of the entities are totaled and stored. Using these stored totals, the invention determines a maximum liquidity draw for the simulation. This constitutes one full Monte-Carlo simulation. However, this does not provide sufficient probability data, and therefore this is repeated many times, typically on the order of 30,000 times. The maximum liquidity draw for each of those 30,000 or so simulations is saved and a histogram of the simulation results is prepared, such as illustrated in FIG. 16A. Here, the height of each bar represents the number of times the simulation yielded a maximum liquidity draw within the boundaries of the bin. The probability distribution of FIG. 16A is converted to a cumulative probability distribution, such as illustrated in FIG. 16B. Using these histograms, and a desired assurance level, it is possible to determine the probabilities of different liquidity requirements. For example, if a 90 percent confidence is desired, the required minimum liquidity might be 15% of total commitments, while 95 percent confidence might require at least 20% liquidity of total commitments. Finally, 99 percent confidence might require at least 25% liquidity of total commitments.

The example description above has not considered the probability that any of the banks providing liquidity commitments would default, or be unable to meet their shared liquidity requirements. Accordingly, in a similar manner, the system and method of the instant invention also performs a Monte-Carlo simulation of bank or institution failure or default for each of the simulation periods. Using this simulation, the invention determines the probability of failure or default and can determine and assess the required number of banks or institutions.

Although illustrative embodiments have been described herein in detail, it should be noted and will be appreciated by those skilled in the art that numerous variations may be made within the scope of this invention without departing from the principle of this invention and without sacrificing its chief advantages.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

We claim:

1. A computer implemented method for managing liquidity requirements of asset backed commercial paper, wherein the method is executed by a programmed computer processor, the computer implemented method comprising the steps of:

identifying, via the programmed computer processor, a full liquidity commitment for a financial instrument of at least one financial institution wherein the financial instrument is guaranteed by a plurality of assets;

determining, via the programmed computer processor, a rating for each of the plurality of assets guaranteeing the financial instrument for a predetermined period of time, wherein the rating provides an indication of creditworthiness of an issuer of each asset;

determining, via the programmed computer processor, a rating transition probability for each of the plurality of assets for the predetermined period of time based at least in part on statistics indicating a likelihood of a rating transition based on historical data;

determining, via the programmed computer processor, whether a draw event occurred for a time period prior to the predetermined time period;

determining, via the programmed computer processor, a probability of a continuing draw event over the predetermined time period, if the draw event is determined;

determining, via the programmed computer processor, a probability of a new draw event for a time period after the predetermined time period, if no draw event is determined;

wherein the steps of determining a rating, determining a rating transition probability, determining whether a draw event occurred, determining a probability of a continuing draw event and determining a probability of a new draw event are performed for a plurality of predetermined time periods;

performing, via the programmed computer processor, a simulation thereby predicting one or more liquidity funding needs associated with the plurality of assets; and estimating, via the programmed computer processor, a reduced liquidity level for the financial instrument that is less than the full liquidity commitment for the financial instrument wherein the reduced liquidity level satisfies the one or more liquidity funding needs as determined by the simulation.

2. A method according to claim 1, wherein the financial instrument comprises a commercial paper.

3. A method according to claim 1, wherein the rating transition probability is based on a ratings transition matrix.

4. A method according to claim 1, wherein the at least one financial institution further comprises a plurality of banks, wherein the simulation further comprises the step of determining probabilities of default by the plurality of banks.

5. A method according to claim 1, wherein the assets guaranteeing the financial instrument are correlated, wherein the simulation further comprises the step of creating a virtual portfolio of uncorrelated assets, which model the assets guaranteeing the financial instrument.

6. A method according to claim 1, wherein the assets guaranteeing the financial instrument are correlated, wherein the simulation further comprises the steps of:
   determining a diversity score for the assets; and
   determining characteristics of the assets.

7. A method according to claim 1, wherein the liquidity requirement is calculated using at least a Monte-Carlo technique.

8. A method according to claim 1, wherein the step of determining a rating transition probability considers one or more characteristics of the assets.

9. A method according to claim 1, wherein the at least one financial institution further comprises a plurality of banks, the method further comprising allocating the reduced liquidity level among the plurality of banks.

10. A method according to claim 9, wherein the reduced liquidity level is a percentage of the full liquidity commitment and the allocation is substantially the same percentage for each of the plurality of banks.

11. A non-transitory computer readable medium having stored therein computer executable software code for managing liquidity requirements of asset backed commercial paper, the code when executed by a computer processor performs the method steps comprising:
   identifying a full liquidity commitment for a financial instrument of at least one financial institution wherein the financial instrument is guaranteed by a plurality of assets;
   determining a rating for each of the plurality of assets guaranteeing the financial instrument for a predetermined period of time wherein the rating provides an indication of creditworthiness of an issuer of each asset;
   determining a rating transition probability for each of the plurality of assets for the predetermined period of time based at least in part on statistics indicating a likelihood of a rating transition based on historical data; and
   determining whether a draw event occurred for a time period prior to the predetermined time period;
   determining a probability of a continuing draw event over the predetermined time period, if the draw event is determined;
   determining a probability of a new draw event for a time period after the predetermined time period, if no draw event is determined;
   wherein the steps of determining a rating, determining a rating transition probability, determining whether a draw event occurred, determining a probability of a continuing draw event and determining a probability of a new draw event are executed for a plurality of predetermined time periods;
   performing a simulation thereby predicting one or more liquidity funding needs associated with the plurality of assets; and
   estimating a reduced liquidity level for the financial instrument that is less than the full liquidity commitment for the financial instrument wherein the reduced liquidity level satisfies the one or more liquidity funding needs as determined by the simulation.

12. A non-transitory computer-readable medium having stored therein computer executable software code for managing liquidity requirements of asset backed commercial paper, the code when executed by a computer processor performs the method steps comprising:
   identifying a full liquidity commitment for a financial instrument of at least one financial institution wherein the financial instrument is guaranteed by a plurality of assets;
   determining a rating for each of the plurality of assets guaranteeing the financial instrument for a predetermined period of time wherein the rating provides an indication of creditworthiness of an issuer of each asset;
   determining a rating transition probability for each of the plurality of assets for the predetermined period of time based at least in part on statistics indicating a likelihood of a rating transition based on historical data; and
   determining whether a draw event occurred for a time period prior to the predetermined time period;
   determining a probability of a continuing draw event over the predetermined time period, if the draw event is determined;

determining a probability of a new draw event for a time period after the predetermined time period, if no draw event is determined;

wherein the steps of determining a rating, determining a rating transition probability, determining whether a draw event occurred, determining a probability of a continuing draw event and determining a probability of a new draw event are executed for a plurality of predetermined time periods;

performing a simulation thereby predicting one or more liquidity funding needs associated with the plurality of assets; and estimating a reduced liquidity level for the financial instrument that is less than the full liquidity commitment for the financial instrument wherein the reduced liquidity level satisfies the one or more liquidity funding needs as determined by the simulation.

13. A programmed computer for managing liquidity requirements of asset backed commercial paper, comprising:

a memory having at least one region for storing computer executable program code; and a processor for executing the program code stored in the memory; wherein the processor is operatively connected to the memory and wherein the program code when executed by the programmed computer performs the method steps comprising:

identifying a full liquidity commitment for a financial instrument of at least one financial institution wherein the financial instrument is guaranteed by a plurality of assets;

determining a rating for each of the plurality of assets guaranteeing the financial instrument for a predetermined period of time wherein the rating provides an indication of creditworthiness of an issuer of each asset;

determining a rating transition probability for each of the plurality of assets for the predetermined period of time based at least in part on statistics indicating a likelihood of a rating transition based on historical data; and determining whether a draw event occurred for a time period prior to the predetermined time period;

determining a probability of a continuing draw event over the predetermined time period, if the draw event is determined;

determining a probability of a new draw event for a time period after the predetermined time period, if no draw event is determined;

wherein the steps of determining a rating, determining a rating transition probability, determining whether a draw event occurred, determining a probability of a continuing draw event and determining a probability of a new draw event are executed for a plurality of predetermined time periods;

performing a simulation thereby predicting one or more liquidity funding needs associated with the plurality of assets; and estimating a reduced liquidity level for the financial instrument that is less than the full liquidity commitment for the financial instrument wherein the reduced liquidity level satisfies the one or more liquidity funding needs as determined by the simulation.

* * * * *